(12) United States Patent
Ikeda

(10) Patent No.: US 10,924,735 B2
(45) Date of Patent: Feb. 16, 2021

(54) IMAGE PROCESSING APPARATUS AND IMAGE PROCESSING METHOD

(71) Applicant: SONY CORPORATION, Tokyo (JP)

(72) Inventor: Masaru Ikeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/463,609

(22) PCT Filed: Dec. 1, 2017

(86) PCT No.: PCT/JP2017/043355
§ 371 (c)(1),
(2) Date: May 23, 2019

(87) PCT Pub. No.: WO2018/123444
PCT Pub. Date: Jul. 5, 2018

(65) Prior Publication Data
US 2019/0313095 A1   Oct. 10, 2019

(30) Foreign Application Priority Data

Dec. 28, 2016   (JP) ................ 2016-256931

(51) Int. Cl.
*H04N 19/117* (2014.01)
*H04N 19/157* (2014.01)
(Continued)

(52) U.S. Cl.
CPC ......... *H04N 19/117* (2014.11); *H04N 19/157* (2014.11); *H04N 19/176* (2014.11);
(Continued)

(58) Field of Classification Search
CPC .. H04N 19/117; H04N 19/157; H04N 19/176; H04N 19/186; H04N 19/82; H04N 19/86
See application file for complete search history.

(56) References Cited

U.S. PATENT DOCUMENTS

2012/0082233 A1* 4/2012 Sze .................. H04N 19/13
375/240.18
2012/0189051 A1   7/2012 Zheng et al.
(Continued)

FOREIGN PATENT DOCUMENTS

AR           092669 A1    4/2015
AU      2013281945 A1   12/2014
(Continued)

OTHER PUBLICATIONS

International Search Report and Written Opinion of PCT Application No. PCT/JP2017/043355, dated Jan. 23, 2018, 11 pages of ISRWO.
(Continued)

*Primary Examiner* — Jonathan R Messmore
(74) *Attorney, Agent, or Firm* — Chip Law Group

(57) ABSTRACT

An image processing apparatus including a decoding section that decodes an encoded stream to generate a decoded image, and a filtering section that applies, with respect to a block boundary of the decoded image generated by the decoding section, a deblocking filter to pixels positioned near the block boundary based on a boundary strength value set on the basis of information associated with a newly introduced encoding process or a newly introduced main encoding process.

14 Claims, 21 Drawing Sheets

(51) Int. Cl.
*H04N 19/176* (2014.01)
*H04N 19/186* (2014.01)
*H04N 19/82* (2014.01)
*H04N 19/86* (2014.01)

(52) U.S. Cl.
CPC ........... *H04N 19/186* (2014.11); *H04N 19/82* (2014.11); *H04N 19/86* (2014.11)

(56) References Cited

U.S. PATENT DOCUMENTS

| | | | |
|---|---|---|---|
| 2013/0028531 A1* | 1/2013 | Sato ........................ | H04N 19/86 382/233 |
| 2013/0094572 A1* | 4/2013 | Van der Auwera .... | H04N 19/70 375/240.03 |
| 2013/0223532 A1* | 8/2013 | Xi .......................... | H04N 19/117 375/240.16 |
| 2014/0003497 A1 | 1/2014 | Sullivan et al. | |
| 2014/0269896 A1* | 9/2014 | Dao ........................ | H04N 19/91 375/240.02 |
| 2015/0139305 A1 | 5/2015 | Sato et al. | |
| 2015/0373327 A1* | 12/2015 | Zhang .................... | H04N 19/186 375/240.03 |
| 2016/0241868 A1 | 8/2016 | Li et al. | |
| 2020/0107020 A1* | 4/2020 | Kanoh ................... | H04N 19/196 |

FOREIGN PATENT DOCUMENTS

| | | |
|---|---|---|
| AU | 2013403224 A1 | 3/2016 |
| CA | 2874723 A1 | 1/2014 |
| CA | 2924763 A1 | 4/2015 |
| CA | 2928495 A1 | 4/2015 |
| CA | 2949542 A1 | 12/2015 |
| CN | 102090062 A | 6/2011 |
| CN | 104380732 A | 2/2015 |
| CN | 104584559 A | 4/2015 |
| CN | 105765974 A | 7/2016 |
| CN | 106464885 A | 2/2017 |
| EP | 2879378 A1 | 6/2015 |
| JP | 2011-517230 A | 5/2011 |
| JP | 2015-526971 A | 9/2015 |
| JP | 2016-539542 A | 12/2016 |
| KR | 10-2010-0132973 A | 12/2010 |
| KR | 10-2015-0034130 A | 4/2015 |
| KR | 10-2015-0034142 A | 4/2015 |
| KR | 10-2016-0072181 A | 6/2016 |
| KR | 10-2017-0020769 A | 2/2017 |
| MU | 2014016001 A | 4/2015 |
| MX | 2016004705 A | 7/2016 |
| RU | 2014152111 A | 7/2016 |
| RU | 2016114182 A | 10/2017 |
| TW | 201404169 A | 1/2014 |
| TW | 201424378 A | 6/2014 |
| WO | 2014/002897 A1 | 1/2014 |
| WO | 2015/054811 A1 | 4/2015 |
| WO | 2015/196126 A1 | 12/2015 |

OTHER PUBLICATIONS

Yuan, et al., "Clean-Up of NSQT implementation", Joint Collaborative Team on Video Coding (JCT-VC) of ITU-T SG 16 WP3 and ISO/IEC JTC 1/SC29/WG11, 8 Meeting, San Jose, JCTVC-H0492, Feb. 1-10, 2012, pp. 1-5.

Chen, et al., "Algorithm Description of Joint Exploration Test Model 4", Joint Video Exploration Team (JVET) of ITU-T SG 16 WP 3 and ISO/IEC JTC 1/SC 29/WG 11, 4 Meeting, Chengdu, JVET-D1001_v3, Oct. 15-21, 2016, 39 pages.

"High Efficiency Video Coding", Series H: Audiovisual and Multimedia Systems Infrastructure of audiovisual services—Coding of moving video, Telecommunication Standardization Sector of ITU, H.265, Apr. 2015, 634 pages.

Chen, et al., "Algorithm Description of Joint Exploration Test Model 4", Joint Video Exploration Team (JVET) of ITU-T SG 16 WP 3 and ISO/IEC JTC 1/SC 29/WG 11, 4th Meeting: Chengdu, JVET-D1001_v3, Oct. 15-21, 2016, 39 pages.

"High Efficiency Video Coding", Series H: Audiovisual and Multimedia Systems, Infrastructure of audiovisual services—Coding of moving video, Telecommunication Standardization Sector of ITU, H.265, Apr. 2015, pp. 1-634.

Chen, et al., "Algorithm Description of Joint Exploration Test Model 4" Joint Video Exploration Team (JVET) of ITU-T SG16 WP3 and ISO/IEC JTC1/SC29/WG11, 4th meeting, Chengdu, CN, JVET-D1001_v3, Oct. 15-21, 2016, 39 pages.

Yuan, et al., "Clean-up of NSQT Implementation" Joint Collaborative Team on Video Coding (JCT-VC) of ITU-T SG16 WP3 and ISO/IEC JTC1/SC29/WG11, 8th meeting, San Jose, CA, USA, JCTVC-H0492, Feb. 1-10, 2012, pp. 1-5.

\* cited by examiner

FIG. 8

| CONDITION | bS |
|---|---|
| CONDITION A:<br>IS INTRA-PREDICTION MODE | 2 |
| CONDITION B:<br>HAS NON-ZERO TRANSFORM COEFFICIENTS<br>OR<br>MV/REFERENCE PICTURE IS DIFFERENT | 1 |

FIG. 9

| EXISTING CONDITION | NEW CONDITION | bS |
|---|---|---|
| CONDITION A:<br>IS INTRA-PREDICTION MODE | CONDITION D:<br>APPLICATION/NON-APPLICATION OF<br>Intra BC IS DIFFERENT | 3 |
| | CONDITION E:<br>APPLICATION/NON-APPLICATION<br>OF PDPC IS DIFFERENT | 3 |
| | CONDITION F:<br>Transform Set IS DIFFERENT<br>OR<br>NSST Index IS DIFFERENT<br>OR<br>SIMPLIFICATION/NON-SIMPLIFICATION<br>OF TRANSFORM PROCESS<br>IS DIFFERENT | 3 |
| | - | 2 |
| CONDITION B:<br>HAS NON-ZERO TRANSFORM<br>COEFFICIENTS<br>OR<br>MV/REFERENCE PICTURE<br>IS DIFFERENT | CONDITION G:<br>APPLICATION/NON-APPLICATION OF<br>Affine MC IS DIFFERENT | 2 |
| | CONDITION H:<br>SIMPLIFICATION/NON-SIMPLIFICATION OF<br>TRANSFORM PROCESS IS DIFFERENT | 2 |
| | - | 1 |

FIG. 10

| CONDITION RELATED TO PREDICTION PROCESS | CONDITION RELATED TO TRANSFORM PROCESS | bS |
|---|---|---|
| CONDITION I: APPLICATION/ NON-APPLICATION OF Intra BC IS DIFFERENT | CONDITION F: Transform Set IS DIFFERENT OR NSST Index IS DIFFERENT OR SIMPLIFICATION/NON-SIMPLIFICATION OF TRANSFORM PROCESS IS DIFFERENT | 4 |
| | - | 3 |
| CONDITION J: IS INTRA-PREDICTION MODE | CONDITION F: Transform Set IS DIFFERENT OR NSST Index IS DIFFERENT OR SIMPLIFICATION/NON-SIMPLIFICATION OF TRANSFORM PROCESS IS DIFFERENT | 3 |
| | - | 2 |
| CONDITION K: HAS NON-ZERO TRANSFORM COEFFICIENTS OR MV/REFERENCE PICTURE IS DIFFERENT OR APPLICATION/NON-APPLICATION OF Affine MC IS DIFFERENT | CONDITION H: SIMPLIFICATION/NON-SIMPLIFICATION OF TRANSFORM PROCESS IS DIFFERENT | 2 |
| | - | 1 |
| ---- | CONDITION H: SIMPLIFICATION/NON-SIMPLIFICATION OF TRANSFORM PROCESS IS DIFFERENT | 1 |

FIG. 11

| EXISTING CONDITION | NEW CONDITION | bS |
|---|---|---|
| CONDITION A: IS INTRA-PREDICTION MODE | CONDITION D: APPLICATION/NON-APPLICATION OF Intra BC IS DIFFERENT | 3 |
| | CONDITION E: APPLICATION/NON-APPLICATION OF PDPC IS DIFFERENT | 3 |
| | CONDITION F: Transform Set IS DIFFERENT OR NSST Index IS DIFFERENT OR SIMPLIFICATION/NON-SIMPLIFICATION OF TRANSFORM PROCESS IS DIFFERENT | 3 |
| | - | 2 |

FIG. 12

| CONDITION RELATED TO PREDICTION PROCESS | CONDITION RELATED TO TRANSFORM PROCESS | bS |
|---|---|---|
| CONDITION I: APPLICATION/NON-APPLICATION OF Intra BC IS DIFFERENT | CONDITION F: Transform Set IS DIFFERENT OR NSST Index IS DIFFERENT OR SIMPLIFICATION/NON-SIMPLIFICATION OF TRANSFORM PROCESS IS DIFFERENT | 4 |
| | - | 3 |
| CONDITION J: IS INTRA-PREDICTION MODE | CONDITION F: Transform Set IS DIFFERENT OR NSST Index IS DIFFERENT OR SIMPLIFICATION/NON-SIMPLIFICATION OF TRANSFORM PROCESS IS DIFFERENT | 3 |
| | - | 2 |

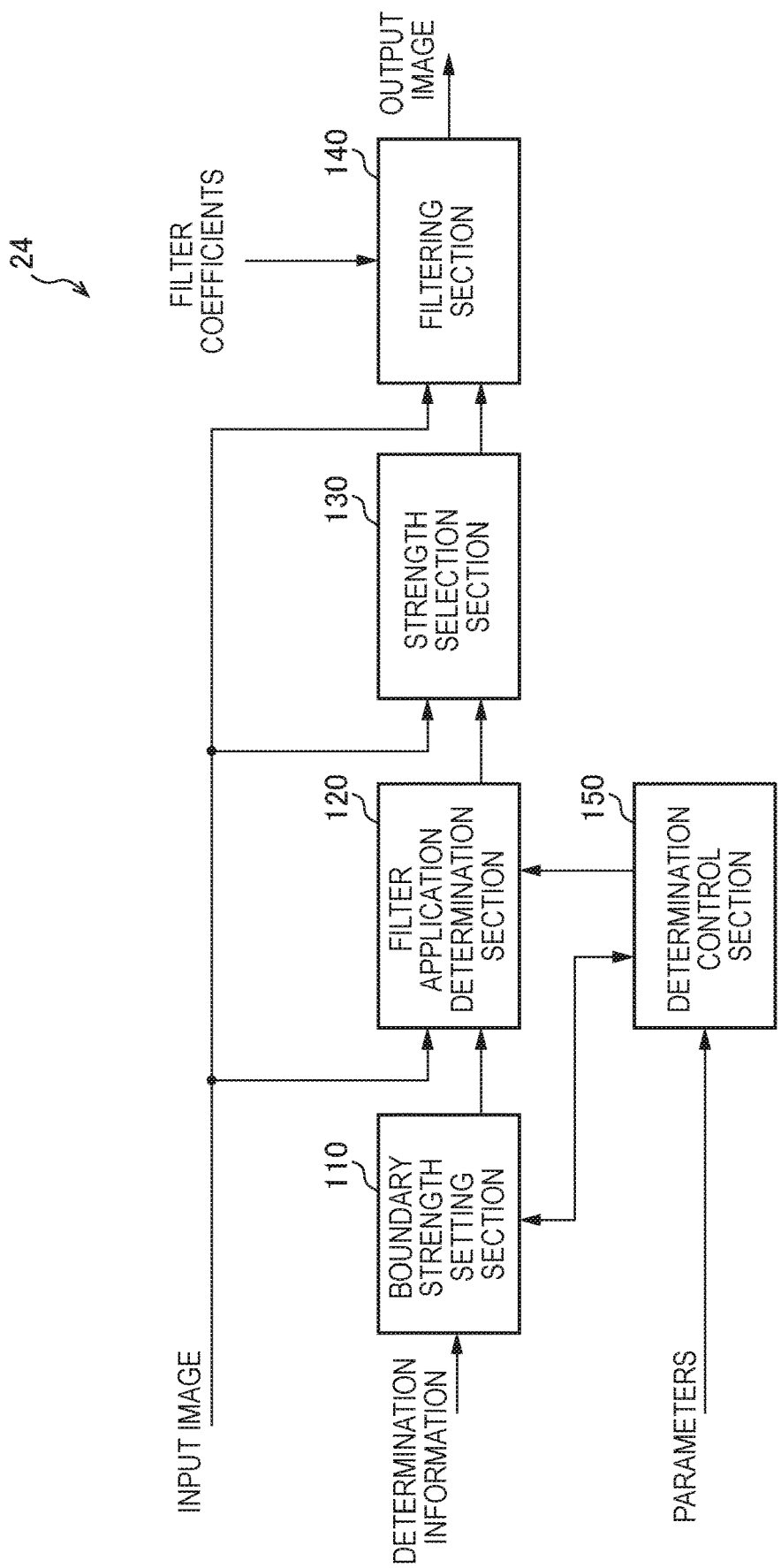

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/043355 filed on Dec. 1, 2017, which claims priority benefit of Japanese Patent Application No. JP 2016-256931 filed in the Japan Patent Office on Dec. 28, 2016. Each of the above-referenced applications is hereby incorporated herein by reference in its entirety.

TECHNICAL FIELD

The present disclosure relates to an image processing apparatus and an image processing method.

BACKGROUND ART

In HEVC/H.265, one of the standard image coding scheme specifications, to restrain degradations in image quality caused by blocking artifacts that occur during image coding, a deblocking filter is applied to the block boundaries for example (see Non-Patent Literature 1). In HEVC/H.265, a determination of the need to apply a deblocking filter and a selection of the filter strength are performed on the basis of a boundary strength value bS of the block boundary.

Also, currently, for the purpose of improving the coding efficiency further over HEVC/H.265, the study of a next-generation image coding scheme called Future Video Coding (FVC) is being carried out by the Joint Video Exploration Team (JVET), a joint standards body of ITU-T and ISO/IEC (for example, see Non-Patent Literature 2).

In Non-Patent Literature 2, encoding processes not introduced in HEVC/H.265 are newly introduced. For example, Non-Patent Literature 2 describes a more complex transform process than HEVC/H.265, the addition of new modes to the prediction modes, and the like.

CITATION LIST

Non-Patent Literature

Non-Patent Literature 1: Recommendation ITU-T H.265, (April 2015) "High efficiency video coding", April 2015
Non-Patent Literature 2: J. Chen, E. Alshina, G. J. Sullivan, J.-R. Ohm, J. Boyce, "Algorithm Description of Joint Exploration Test Model 4", JVET-D1001_v3, Joint Video Exploration Team (JVET) of ITU-T SG 16 WP 3 and ISO/IEC JTC 1/SC 29/WG 11 4th Meeting: Chengdu, Conn., 15-21 Oct. 2016

DISCLOSURE OF INVENTION

Technical Problem

Because of such newly introduced encoding processes, signal characteristics may differ between blocks. However, in the case in which the boundary strength value bS is set by the method adopted in HEVC/H.265, the deblocking filter cannot be applied appropriately to a block boundary affected by the newly introduced encoding processes, and there is a risk that blocking artifacts will remain.

The present disclosure has been devised in light of such circumstances, and makes it possible to reduce blocking artifacts further.

Solution to Problem

According to the present disclosure, there is provided an image processing apparatus including: a decoding section configured to decode an encoded stream to generate a decoded image; and a filtering section configured to apply, with respect to a block boundary of the decoded image generated by the decoding section, a deblocking filter to pixels positioned near the block boundary in accordance with a boundary strength value set on the basis of information associated with a newly introduced encoding process or a newly introduced main encoding process.

In addition, according to the present disclosure, there is provided an image processing method including: decoding an encoded stream to generate a decoded image; and applying, with respect to a block boundary of the decoded image, a deblocking filter to pixels positioned near the block boundary in accordance with a boundary strength value set on the basis of information associated with a newly introduced encoding process or a newly introduced main encoding process.

In addition, according to the present disclosure, there is provided an image processing apparatus including: a filtering section configured to apply, with respect to a block boundary of a locally-decoded decoded image, a deblocking filter to pixels positioned near the block boundary in accordance with a boundary strength value set on the basis of information associated with a newly introduced encoding process or a newly introduced main encoding process; and an encoding section configured to encode an image using the decoded image to which the filtering section has applied the deblocking filter.

In addition, according to the present disclosure, there is provided an image processing method including: applying, with respect to a block boundary of a locally-decoded decoded image, a deblocking filter to pixels positioned near the block boundary in accordance with a boundary strength value set on the basis of information associated with a newly introduced encoding process or a newly introduced main encoding process; and encoding an image using the decoded image to which the deblocking filter has been applied.

Advantageous Effects of Invention

According to the present disclosure as described above, it is possible to reduce blocking artifacts further.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a table for explaining the setting of the boundary strength value bS in HEVC.

FIG. 9 is a table for explaining a first example of setting a boundary strength value of the luminance component according to the embodiment.

FIG. 10 is a table for explaining a second example of setting a boundary strength value of the luminance component according to the embodiment.

FIG. 11 is a table for explaining a first example of setting a boundary strength value of the chrominance component according to the embodiment.

FIG. 12 is a table for explaining a second example of setting a boundary strength value of the chrominance component according to the embodiment.

FIG. 13 is a block diagram illustrating one example of a detailed configuration of a deblocking filter according to the embodiment.

MODE(S) FOR CARRYING OUT THE INVENTION

Figure 1:
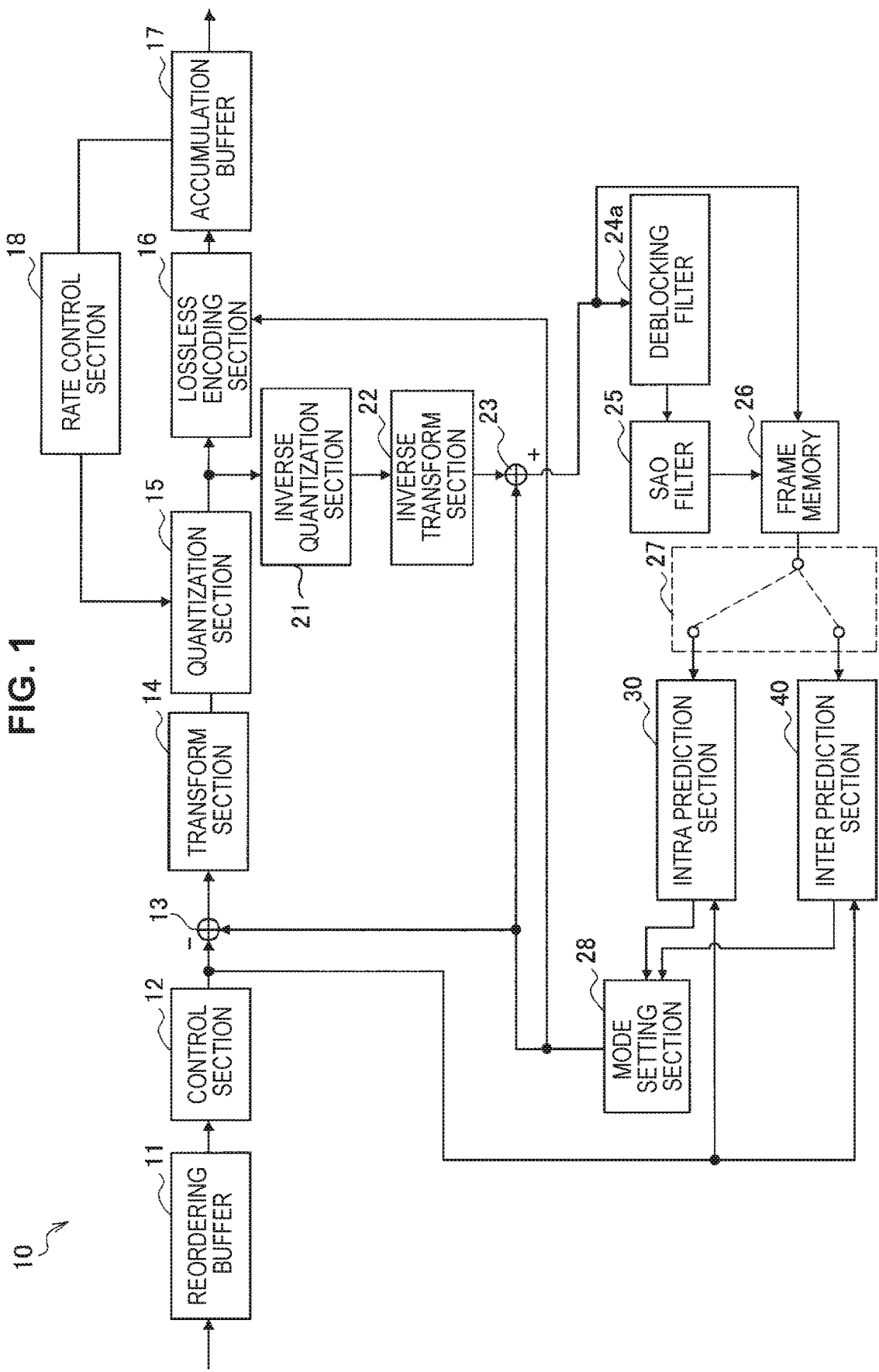
FIG. 1 is a block diagram illustrating one example of the configuration of an image encoding apparatus 10, which is one aspect of an image processing apparatus according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Hereinafter, the description will proceed in the following order.

1. Overview of apparatus
1-1. Image coding apparatus
1-2. Image decoding apparatus
2. Example of newly introduced encoding processes
3. Deblocking filter
3-1. Description of existing process
3-2. Exemplary configuration of deblocking filter according to embodiment
3-3. Process flow
4. Exemplary hardware configuration
5. Application example
6. Conclusion

1. OVERVIEW OF APPARATUS

Figure 2:
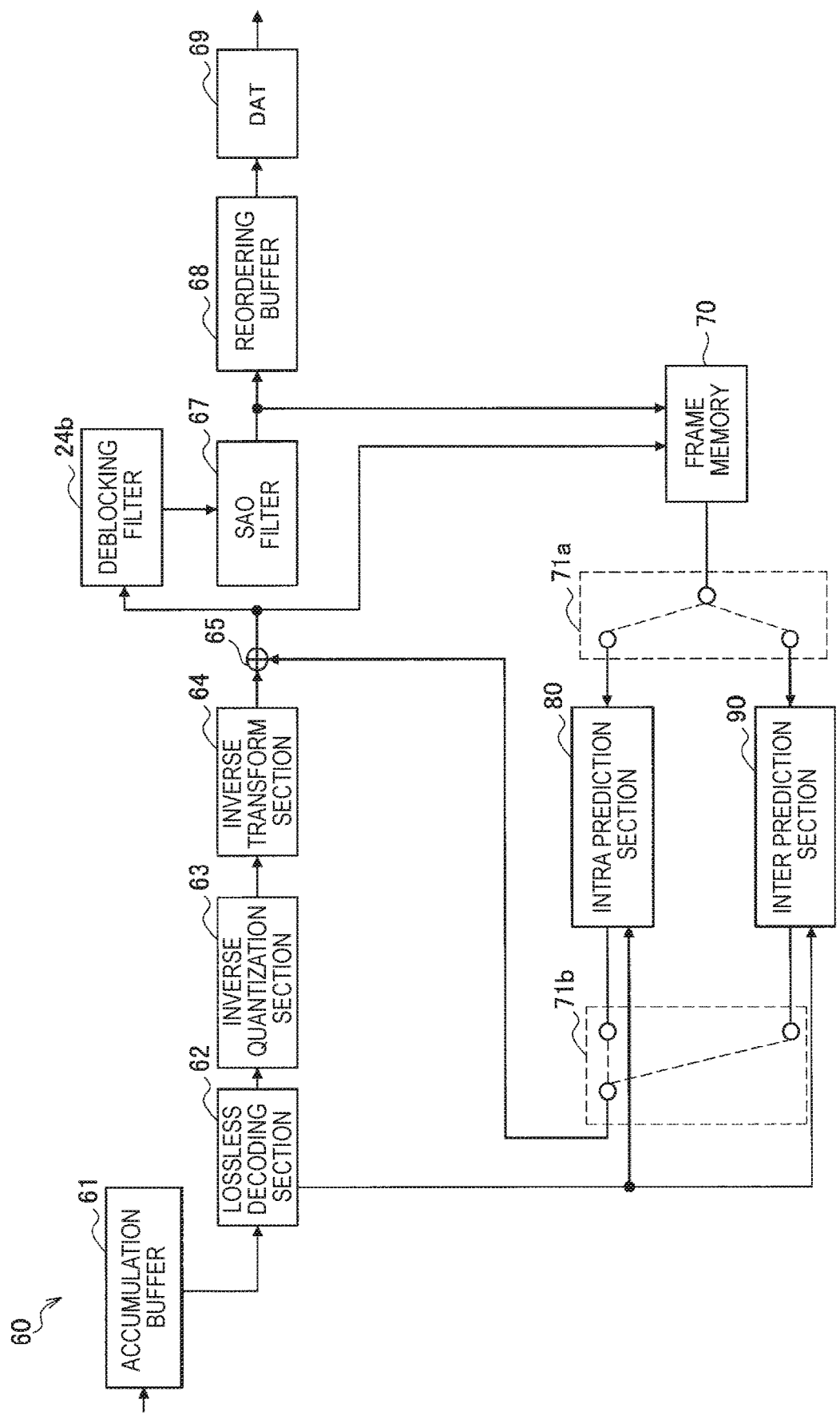
FIG. 2 is a block diagram illustrating one example of the configuration of an image decoding apparatus 60, which is one aspect of an image processing apparatus according to the embodiment.

First, FIGS. 1 and 2 will be used to describe an overview of apparatus that serve as one applicable example of the technology disclosed in this specification. For example, the technology disclosed in this specification is applicable to an image encoding apparatus and an image decoding apparatus.

[1-1. Image Encoding Apparatus]

FIG. 1 is a block diagram illustrating one example of the configuration of an image encoding apparatus 10, which is one aspect of an image processing apparatus according to one embodiment of the present disclosure. Referring to FIG. 1, the image encoding apparatus 10 is provided with a re-ordering buffer 11, a control section 12, a subtraction section 13, a transform section 14, a quantization section 15, a lossless encoding section 16, an accumulation buffer 17, an inverse quantization section 21, an inverse transform section 22, an addition section 23, a deblocking filter 24a, an SAO filter 25, frame memory 26, a switch 27, a mode setting section 28, an intra-prediction section 30, and an inter-prediction section 40.

The re-ordering buffer 11 re-orders the image data of a series of images included in video to be encoded, in accordance with a Group of Pictures (GOP) structure according to the encoding process. The re-ordering buffer 11 outputs the re-ordered image data to the control section 12, the subtraction section 13, the intra-prediction section 30, and the inter-prediction section 40.

The control section 12 partitions the image data into blocks of the units of processing, on the basis of a block size of the units of processing designated externally or in advance. An example of the block partitioning is described later. Also, the control section 12 decides encoding parameters associated with the encoding process on the basis of rate-distortion optimization (RDO), for example. The decided encoding parameters are supplied to each section.

The subtraction section 13 calculates prediction error data, which is the difference between the image data input from the re-ordering buffer 11 and the predicted image data, and outputs the calculated prediction error data to the transform section 14.

The transform section 14 executes a transform process for each of one or more transform blocks set inside each region. A transform matrix related to the transform applied by the transform section 14 may be selected on the basis of encoding parameters supplied from the control section 12 for example. The transform section 14 outputs transform coefficient data obtained by transforming the prediction error data input from the subtraction section 13 for each transform block to the quantization section 15.

The quantization section 15 is supplied with transform coefficient data input from the transform section 14 and a rate control signal from a rate control section 18 described later. The quantization section 15 quantizes the transform coefficient data, and outputs the quantized transform coefficient data (hereinafter also called quantized data) to the lossless encoding section 16 and the inverse quantization section 21. The quantization section 15 also varies the bit rate of quantized data input into the lossless encoding section 16 by switching a quantization scale on the basis of the rate control signal from the rate control section 18.

The lossless encoding section 16 generates an encoded stream by encoding quantized data input from the quantization section 15. Also, the lossless encoding section 16 encodes various encoding parameters to be referenced by the decoder, and inserts the encoded encoding parameters into the encoded stream. The encoding parameters encoded by the lossless encoding section 16 may include the encoding parameters decided by the control section 12 described above. The lossless encoding section 16 outputs the generated encoded stream to the accumulation buffer 17.

The accumulation buffer 17 uses a storage medium such as semiconductor memory to temporarily buffer the encoded stream input from the lossless encoding section 16. Subsequently, the accumulation buffer 17 outputs the buffered encoded stream to a transmission section not illustrated (such as a communication interface or a connection interface that connects with peripheral equipment, for example), at a rate according to the bandwidth of the transmission channel.

The rate control section 18 monitors the amount of free space in the accumulation buffer 17. Subsequently, the rate control section 18 generates a rate control signal according to the amount of free space in the accumulation buffer 17, and outputs the generated rate control signal to the quantization section 15. For example, when there is not much free space in the accumulation buffer 17, the rate control section 18 generates a rate control signal for lowering the bit rate of the quantized data. Also, for example, when there is a sufficiently large amount of free space in the accumulation buffer 17, the rate control section 18 generates a rate control signal for raising the bit rate of the quantized data.

The inverse quantization section 21, the inverse transform section 22, and the addition section 23 form a local decoder. The local decoder has a role of locally decoding decoded image data from encoded data.

The inverse quantization section 21 inversely quantizes the quantized data with the same quantization parameter as that used by the quantization section 15, and restores the transform coefficient data. Subsequently, the inverse quantization section 21 outputs the restored transform coefficient data to the inverse transform section 22.

The inverse transform section 22 reconstructs the prediction error data by executing an inverse transform process on the transform coefficient data input from the inverse quantization section 21. Subsequently, the inverse transform section 22 outputs the reconstructed prediction error data to the addition section 23.

The addition section 23 adds the restored prediction error data input from the inverse transform section 22 to the predicted image data input from the intra-prediction section 30 or the inter-prediction section 40 to thereby generate decoded image data (reconstructed image). Then, the addition section 23 outputs the generated decoded image data to the deblocking filter 24a and the frame memory 26.

The deblocking filter 24a and the SAO filter 25 are both in-loop filters for improving image quality of reconstructed images or improving coding efficiency.

The deblocking filter 24a reduces blocking artifacts by filtering the decoded image data input from the addition section 23, and outputs the filtered decoded image data to the SAO filter 25. Note that the processing by the deblocking filter 24a will be described in detail later.

The SAO filter 25 removes noises by applying an edge offset process or a band offset process to the decoded image data input from the deblocking filter 24a and outputs the processed decoded image data to the frame memory 26.

The frame memory 26 stores the un-filtered decoded image data input from the addition section 23 and the decoded image data to which in-loop filtering has been applied input from the SAO filter 25 in a storage medium.

The switch 27 reads the un-filtered decoded image data to be used for the intra-prediction out from the frame memory 26 and supplies the read decoded image data as reference image data to the intra-prediction section 30. Further, the switch 27 reads the filtered decoded image data to be used for the inter-prediction out from the frame memory 26 and supplies the read decoded image data as reference image data to the inter-prediction section 40.

The mode setting section 28 sets a predictive coding mode for each block on the basis of a comparison of costs input from the intra-prediction section 30 and the inter-prediction section 40. For a block in which an intra-prediction mode is set, the mode setting section 28 outputs the predicted image data generated by the intra-prediction section 30 to the subtraction section 13 and the addition section 23, and also outputs information related to intra-prediction to the lossless encoding section 16. Also, for a block in which an inter-prediction mode is set, the mode setting section 28 outputs the predicted image data generated by the inter-prediction section 40 to the subtraction section 13 and the addition section 23, and also outputs information related to inter-prediction to the lossless encoding section 16.

The intra-prediction section 30 performs an intra-prediction process on the basis of original image data and decoded image data. For example, the intra-prediction section 30 evaluates a cost based on a prediction error and an amount of code to be generated for each of prediction mode candidates within a search range. Then, the intra-prediction section 30 selects a prediction mode which minimizes the cost as an optimum prediction mode. In addition, the intra-prediction section 30 generates a predicted image data in accordance with the selected optimum prediction mode. Then, the intra-prediction section 30 outputs information regarding intra-prediction including prediction mode information indicating the optimum prediction mode, a corresponding cost, and the predicted image data to the mode setting section 28.

The inter-prediction section 40 executes an inter-prediction process (motion compensation), on the basis of original image data and decoded image data. For example, the inter-prediction section 40 evaluates a cost based on a prediction error and a generate code rate for each prediction mode candidate included in a search range specified by HEVC. Next, the inter-prediction section 40 selects the prediction mode yielding the minimum cost, or in other words the prediction mode yielding the highest compression ratio, as an optimal prediction mode. In addition, the inter-prediction section 40 generates predicted image data in accordance with the selected optimal prediction mode. Subsequently, the inter-prediction section 40 outputs information related to inter-prediction, the corresponding cost, and the predicted image data to the mode setting section 28.

[1-2. Image Decoding Apparatus]

Next, the decoding of encoded data encoded as above will be described. FIG. 2 is a block diagram illustrating one example of the configuration of an image decoding apparatus 60, which is one aspect of an image processing apparatus according to the present embodiment. Referring to FIG. 2, an accumulation buffer 61, a lossless decoding section 62, an inverse quantization section 63, and an inverse transform section 64, an addition section 65, a deblocking filter 24*b*, an SAO filter 67, a re-ordering buffer 68, a digital to analog (D/A) conversion section 69, frame memory 70, selectors 71*a* and 71*b*, an intra-prediction section 80, and an inter-prediction section 90 are provided.

The accumulation buffer 61 uses a storage medium to temporarily buffer an encoded stream received from the image encoding apparatus 10 via a transmission section not illustrated (such as a communication interface or a connection interface that connects with peripheral equipment, for example).

The lossless decoding section 62 decodes quantized data from the encoded stream input from the accumulation buffer 61, in accordance with the coding scheme used during encoding. The lossless decoding section 62 outputs the decoded quantized data to the inverse quantization section 63.

Also, the lossless decoding section 62 decodes various encoding parameters inserted into the header area of the encoded stream. The parameters decoded by the lossless decoding section 62 may include information related to intra-prediction and information related to inter-prediction, for example. The lossless decoding section 62 outputs information related to intra-prediction to the intra-prediction section 80. Also, the lossless decoding section 62 outputs information related to inter-prediction to the inter-prediction section 90.

The inverse quantization section 63 inversely quantizes the quantized data input from the lossless decoding section 62 with the same quantization step as the one used during encoding, and reconstructs transform coefficient data. The inverse quantization section 63 outputs the reconstructed transform coefficient data to the inverse transform section 64.

The inverse transform section 64 generates prediction error data by performing an inverse transform on the transform coefficient data input from the inverse quantization section 63, in accordance with the transform scheme used during encoding. The inverse transform section 64 outputs the generated prediction error data to the addition section 65.

The addition section 65 generates decoded image data by adding the prediction error data input from the inverse transform section 64 to predicted image data input from the selector 71*b*. Then, the addition section 65 outputs the generated decoded image data to the deblocking filter 24*b* and the frame memory 70.

The deblocking filter 24*b* reduces blocking artifacts by filtering the decoded image data input from the addition section 65, and outputs the filtered decoded image data to the SAO filter 67. Note that the processing by the deblocking filter 24*b* will be described in detail later.

The SAO filter 67 removes noises by applying an edge offset process or a band offset process to the decoded image data input from the deblocking filter 24*b* and outputs the processed decoded image data to the re-ordering buffer 68 and the frame memory 70.

The re-ordering buffer 68 re-orders images input from the SAO filter 67, thereby generating a sequence of time-series image data. Then, the re-ordering buffer 68 outputs the generated image data to the D/A conversion section 69.

The D/A conversion section 69 converts image data in a digital format input from the re-ordering buffer 68 into an image signal in an analog format. Subsequently, for example, the D/A conversion section 69 outputs the analog image signal to a display (not illustrated) connected to the image decoding apparatus 60, and thereby causes decoded video to be displayed.

The frame memory 70 stores the unfiltered decoded image data input from the addition section 65 and the filtered decoded image data input from the SAO filter 67 in a storage medium.

The selector 71*a* switches an output destination of the image data from the frame memory 70 between the intra-prediction section 80 and the inter-prediction section 90 for each block in the image in accordance with prediction mode information acquired by the lossless decoding section 62. In the case where an intra-prediction mode has been designated, for example, the selector 71*a* outputs the decoded image data that has not been filtered supplied from the frame memory 70 to the intra-prediction section 80 as reference image data. In addition, in the case where an inter-prediction mode has been designated, the selector 71*a* outputs the filtered decoded image data to the inter-prediction section 90 as reference image data.

The selector 71*b* switches an output source of the predicted image data to be supplied to the addition section 65 between the intra-prediction section 80 and the inter-prediction section 90 in accordance with prediction mode information acquired by the lossless decoding section 62. In the case where the intra-prediction mode has been designated, for example, the selector 71*b* supplies the predicted image data output from the intra-prediction section 80 to the addition section 65. In addition, in the case where the inter-prediction mode has been designated, the selector 71*b* supplies the predicted image data output from the inter-prediction section 90 to the addition section 65.

The intra-prediction section 80 performs an intra-prediction process on the basis of information regarding intra-prediction input from the lossless decoding section 62 and the reference image data from the frame memory 70, thereby generating the predicted image data. Then, the intra-prediction section 80 outputs the generated predicted image data to the selector 71*b*.

The inter-prediction section 90 performs an inter-prediction process on the basis of information regarding inter-prediction input from the lossless decoding section 62 and the reference image data from the frame memory 70, thereby generating the predicted image data. Then, the inter-prediction section 90 outputs the generated predicted image data to the selector 71*b*.

2. EXAMPLE OF NEWLY INTRODUCED ENCODING PROCESSES

Next, several examples of the newly introduced encoding processes will be described briefly. For details about the newly introduced encoding processes described hereinafter, refer to Non-Patent Literature 2.

Note that in this specification, encoding processes (encoding tools) not described in Non-Patent Literature 1 are collectively designated the newly introduced encoding processes (encoding tools). For example, the newly introduced encoding processes (encoding tools) may include encoding processes (encoding tools) not described in Non-Patent Literature 1 and the encoding processes (encoding tools) described in Non-Patent Literature 2. Also, the newly introduced encoding processes (encoding tools) are not limited to the encoding processes (encoding tools) described in Non-Patent Literature 2, and include encoding processes (encoding tools) not described in Non-Patent Literature 1 and other encoding processes (encoding tools) to be introduced in the future in FVC.

Also, in this specification, encoding processes (encoding tools) stipulated in the Main Profile or the Main10 Profile of HEVC/H.265 are collectively designated the existing main encoding tools, while encoding processes (encoding tools) not stipulated in the Main Profile or the Main10 Profile of HEVC/H.265 are collectively designated the newly introduced main encoding processes (encoding tools).

The above describes encoding processes (encoding tools), but is also similarly applicable to decoding processes (decoding tools) corresponding to the encoding processes (encoding tools), and is also similarly applicable to newly introduced decoding processes (decoding tools) and newly introduced main decoding processes (decoding tools).

(1) Block Partitioning (Newly Introduced Block Structure)

In the following, after first describing block partitioning in HEVC, the block structure called quad tree plus binary tree (QTBT) described in Non-Patent Literature 2 will be described.

Figure 3:
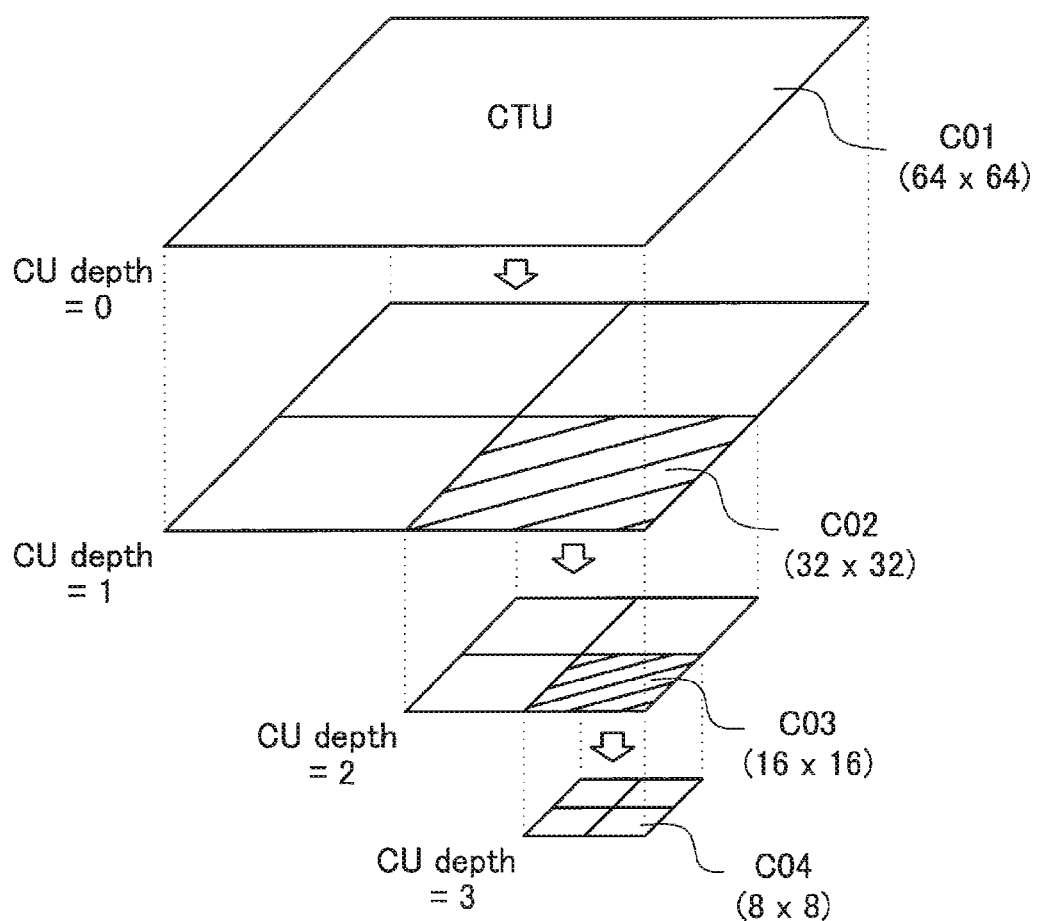
FIG. 3 is an explanatory diagram for explaining an overview of recursive block partitioning for CUs in HEVC.

FIG. 3 is an explanatory diagram for explaining an overview of recursive block partitioning for coding units (CUs) in HEVC. CU block partitioning is performed by recursively repeating the partitioning of a single block into 4(=2×2) sub-blocks, and a tree structure having a quadtree shape is formed as a result. One entire quadtree is called a coding tree block (CTB), and the logical unit corresponding to a CTB is called a coding tree unit (CTU). In the upper part of FIG. 3, as one example, a CU C01 having a size of 64×64 pixels is illustrated. The partitioning depth of the CU C01 is equal to zero. This means that the CU C01 corresponds to the root of the CTU. The size of the CTU or CTB may be designated by a parameter encoded in a sequence parameter set (SPS). A CU C02 is one of four CUs partitioned from the CU C01, and has a size of 32×32 pixels. The partitioning depth of the CU C02 is equal to 1. A CU C03 is one of four CUs partitioned from the CU C02, and has a size of 16×16 pixels. The partitioning depth of the CU C03 is equal to 2. A CU C04 is one of four CUs partitioned from the CU C03, and has a size of 8×8 pixels. The partitioning depth of the CU C04 is equal to 3. In this way, CUs are formed by recursively partitioning an image to be coded. The partitioning depth is variable. For example, in a flat image region such as a blue sky, CUs of larger size (that is, smaller depth) may be set. On the other hand, in a steep image region including many edges, CUs of smaller size (that is, greater depth) may be set. Additionally, the set CUs become the processing units of the coding process.

Figure 4:
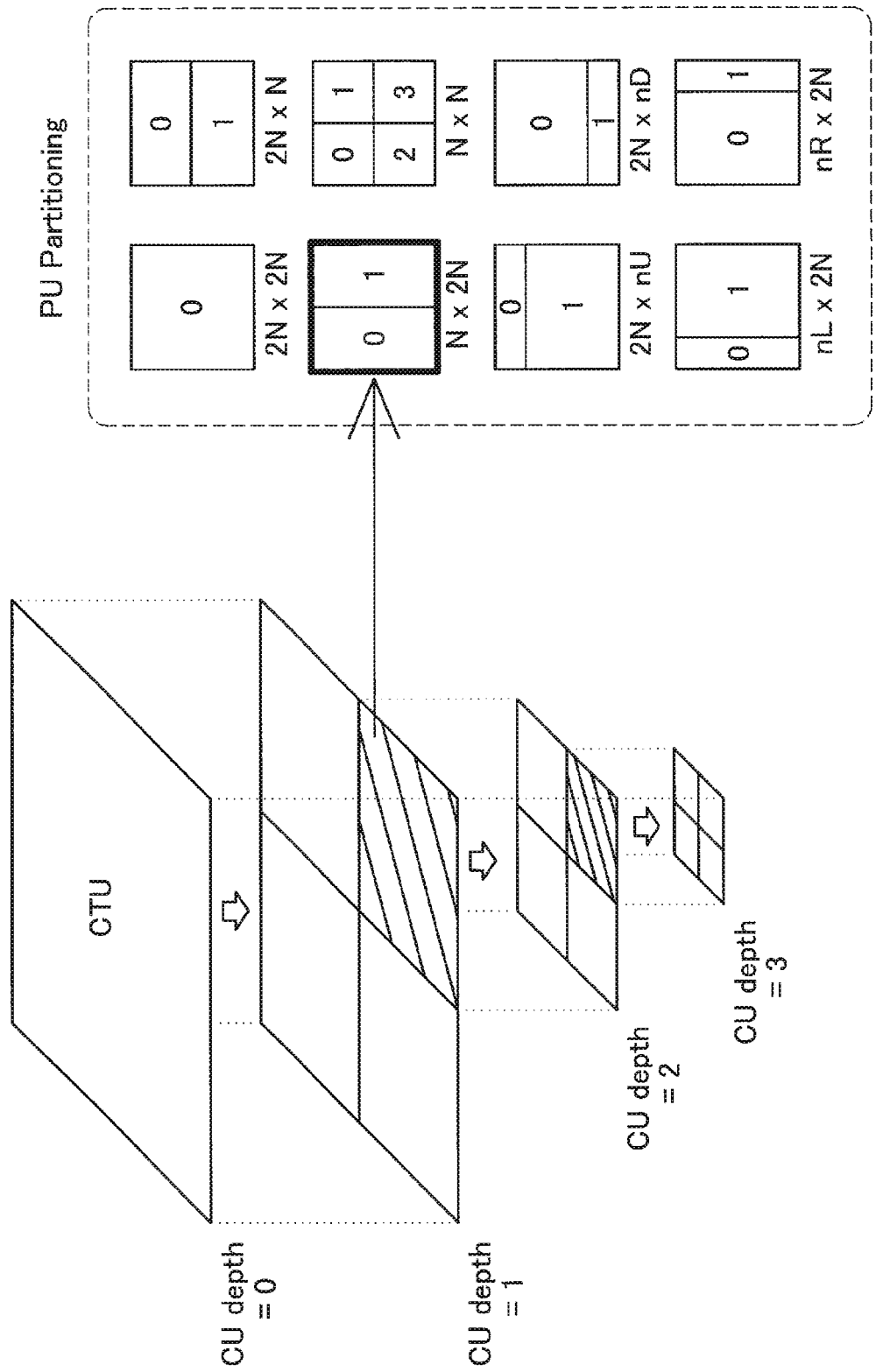
FIG. 4 is an explanatory diagram for explaining the setting of PUs in the CUs.

Prediction units (PUs) are the processing units of a prediction process that includes intra-prediction and inter-prediction. PUs are formed by partitioning a CU according to one of several partitioning patterns. FIG. 4 is an explanatory diagram for explaining the setting of PUs in the CUs illustrated in FIG. 3. The right side of FIG. 4 illustrates eight varieties of partitioning patterns, called 2N×2N, 2N×N, N×2N, N×N, 2N×nU, 2N×nD, nL×2N, and nR×2N. Among these partitioning patterns, in intra-prediction, the two varieties of 2N×2N and N×N are selectable (N×N is selectable only for the SCU). On the other hand, in inter-prediction, in the case in which asymmetric motion partitioning is enabled, all eight varieties of partitioning patterns are selectable.

Figure 5:
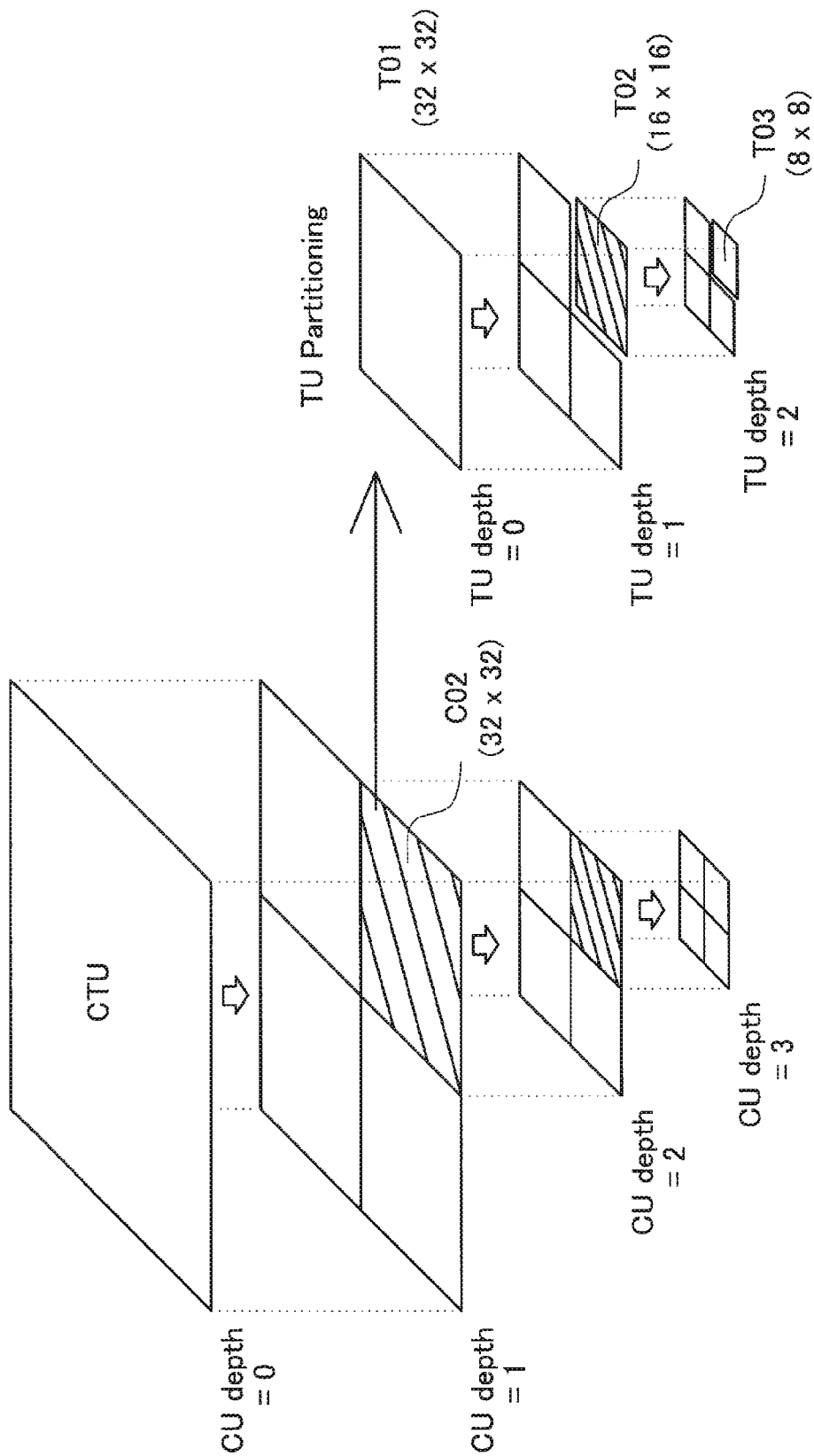
FIG. 5 is an explanatory diagram for explaining the setting of TUs in the CUs.

Transform units (TUs) are the processing units of the orthogonal transform process. TUs are formed by partitioning CUs (for intra CUs, each PU inside a CU) down to a certain depth. FIG. 5 is an explanatory diagram for explaining the setting of TUs in the CUs illustrated in FIG. 3. The right side of FIG. 5 illustrates the one or more TUs that may be set in the CU C02. For example, a TU T01 has a size of 32×32 pixels, and the depth of the TU partitioning is equal to zero. A TU T02 has a size of 16×16 pixels, and the depth of the TU partitioning is equal to 1. A TU T03 has a size of 8×8 pixels, and the depth of the TU partitioning is equal to 2.

What kind of block partitioning is to be performed to set blocks such as the CUs, PUs, and TUs described above in an image typically is decided on the basis of a comparison of the costs governing coding efficiency. The encoder compares the costs between one 2M×2M pixel CU and four M×M pixel CUs for example, and if the coding efficiency is higher by setting the four M×M pixel CUs, the encoder decides to partition the 2M×2M pixel CU into four M×M pixel CUs.

Figure 6:
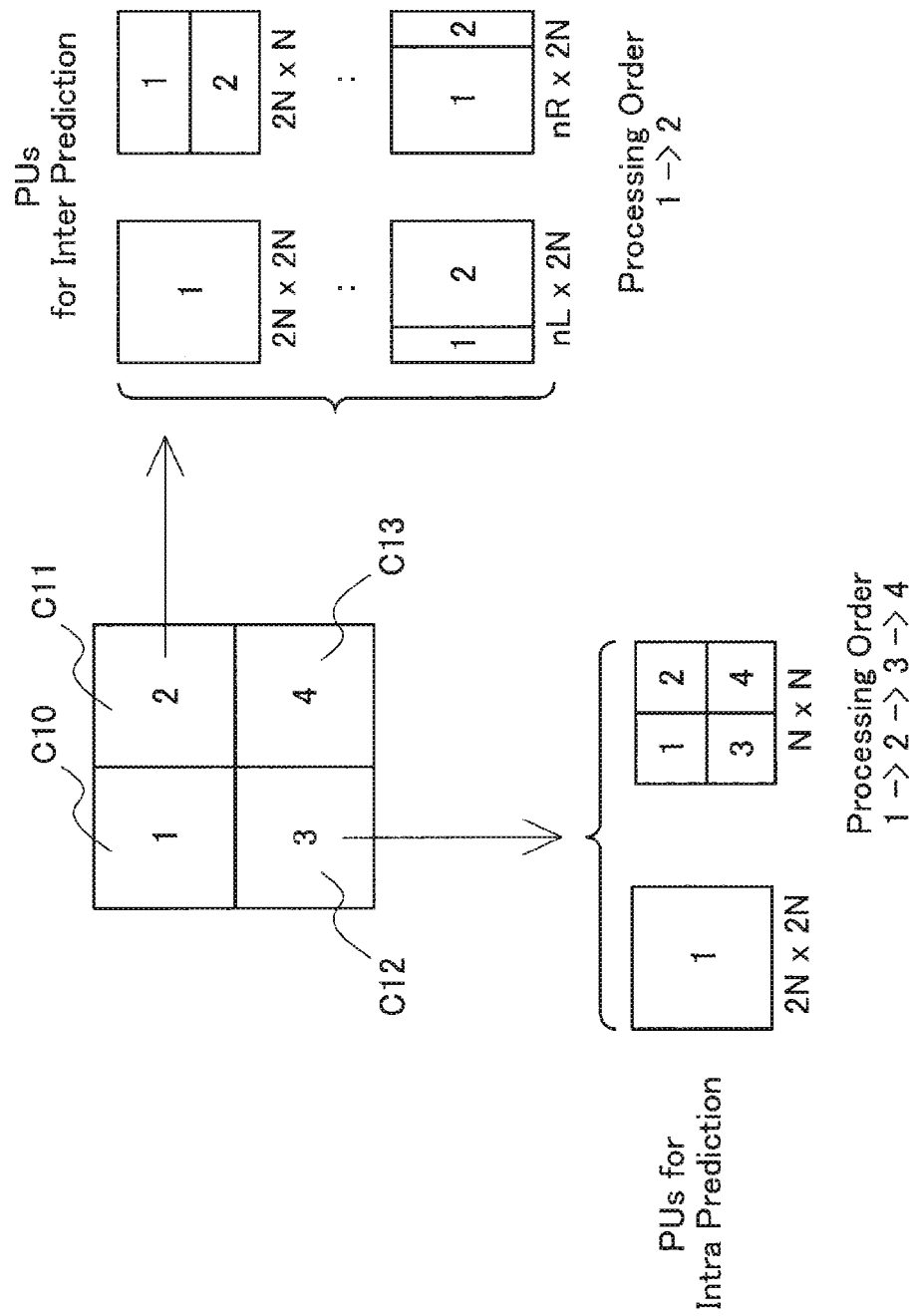
FIG. 6 is an explanatory diagram for explaining the scan order of CUs/PUs.

When encoding an image, the CTB set in a grid inside the image (or slice, tile) is scanned in raster scan order. Inside a single CTB, the CUs are scanned by following the quadtree from left to right and from top to bottom. When processing the current block, information about the blocks adjacent above and to the left is used as input information. FIG. 6 is an explanatory diagram for explaining the scan order of CUs/PUs. The upper left part of FIG. 6 illustrates four CUs C01, C11, C12, and C13 that may be included in a single CTB. The numeral inside the box of each CU represents the processing order. The encoding process is executed in the order of the upper-left CU C10, the upper-right CU C11, the lower-left CU C12, and the lower-right CU C13. The right side of FIG. 6 illustrates one or more PUs for inter-prediction that may be set in the CU C11. The lower part of FIG. 6 illustrates one or more PUs for intra-prediction that may be set in the CU C12. As the numerals inside the boxes of these PUs indicate, PUs are also scanned by going from left to right and from top to bottom.

Figure 7:
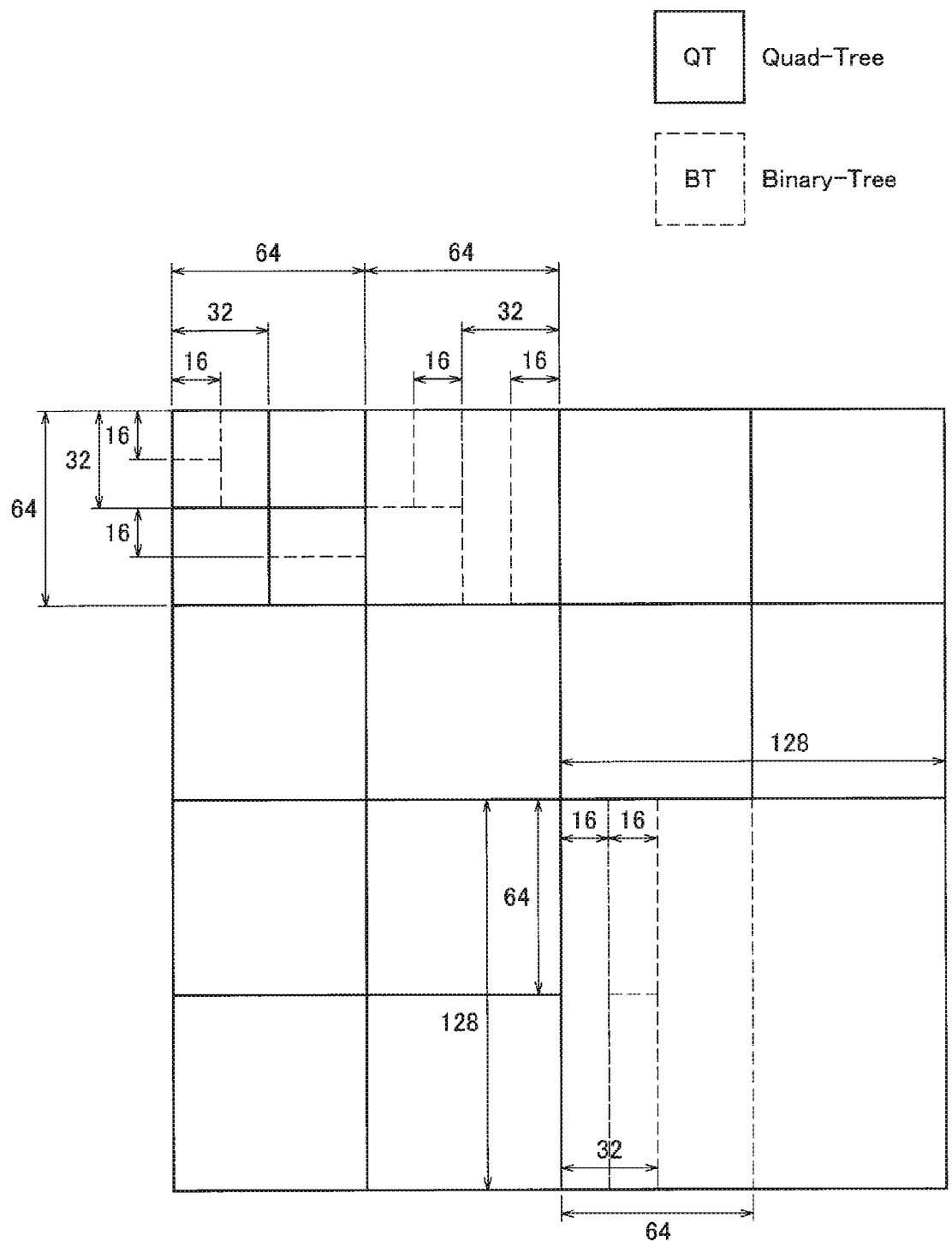
FIG. 7 is a diagram explaining the shapes of CUs, PUs, and TUs in QTBT.

The above describes block partitioning in HEVC. Next, the block structure called QTBT described in Non-Patent Literature 2 will be described. FIG. 7 is a diagram explaining the shapes of CUs, PUs, and TUs in QTBT.

Specifically, in CU block partitioning, a single block may be partitioned not only into 4(=2×2) sub-blocks, but also into 2(=1×2, 2×1) sub-blocks. In other words, CU block partitioning is performed by recursively repeating the partitioning of a single block into 4 or 2 sub-blocks, and as a result, a tree structure having a quadtree shape or a binary tree shape in the horizontal or vertical direction is formed. In QTBT, blocks may be partitioned recursively in accordance with a combination of quadtrees and binary trees.

As a result, the possible CU shapes are not only square, but also rectangular. For example, in the case in which the coding tree unit (CTU) size is 128×128, as illustrated in FIG. 7, the possible CU sizes (horizontal size w×vertical size h) include not only square sizes such as 128×128, 64×64, 32×32, 16×16, 8×8, and 4×4, but also rectangular sizes such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, and 4×8. Note that in Non-Patent Literature 2, the PUs and TUs are the same as the CUs. However, a form in which the CU, PU, and TU block structures are independent of each other is also conceivable. The present technology is applicable not only to the case in which the CUs, PUs, and TUs have the same block structure, but also to the case in which the CUs, PUs, and TUs have independent block structures.

In addition, Non-Patent Literature 2 also describes how the block partitioning of the luminance component (Luma) and the chrominance component (Chroma) during intra-prediction are performed independently.

Note that in this specification, "block" is used in the description to refer to a partial region of an image (picture) or a unit of processing in some cases (not a block of a processing section). A "block" in this case denotes any partial region inside a picture, for which the size, shape, characteristics, and the like are not limited. In other words, a "block" in this case is assumed to include any partial region (unit of processing) such as a TU, PU, CU, CTU, CTB, tile, or slice, for example. Also, in this specification, a block boundary may be the boundary between any of the blocks described above, and includes for example a boundary between blocks partitioned by the block partitioning in HEVC and a boundary between blocks partitioned by the block partitioning in QTBT described above. Furthermore, the present technology is also applicable to the block structures and block boundaries described in JVET-D0117, "Multi-Type-Tree".

(2) Transform Process (Newly Introduced Transform Process/Inverse Transform Process)

In HEVC, an orthogonal transform process is adopted as the transform process. In contrast, examples of newly introduced encoding processes in the transform process include adaptive multiple transform (AMT) and non-separable secondary transform (NSST). AMT and NSST are transform processes that may be applied by the transform section 14 described above for example. AMT is an orthogonal transform process that transforms an image signal in the spatial domain to the frequency domain, while NSST is a transform process applied after the AMT to raise the degree of concentration of coefficient energy. Note that in the following, the transform that the transform section 14 applies first (for example, the AMT described above) is called the primary transform, and the transform applied next (for example, the NSST described above) is called the secondary transform in some cases.

Each of a primary transform and a secondary transform selected from among multiple transform methods is applied. Also, according to the prediction mode in intra-prediction, a primary transform identifier associated with the selection of the primary transform (for example, the Transform Set described in Non-Patent Literature 2) and a secondary transform identifier associated with the selection of the secondary transform (for example, the NSST index described in Non-Patent Literature 2) are specified. The transform section 14 may apply the primary transform corresponding to the primary transform identifier, and may apply the secondary transform corresponding to the secondary transform identifier. Note that the transform section 14 does not have to apply (that is, may also skip) the secondary transform in accordance with the secondary transform identifier.

For example, blocking artifacts may occur due to the applied transform process being different between blocks. In other words, blocking artifacts readily occur in the case in which the primary transform identifier is different between blocks or the case in which the secondary transform identifier is different between blocks.

Additionally, a simplification of the transform process described above is given as an example of a newly introduced encoding process. For example, the transform process is simplified in the case in which the short edge of the transform block is a predetermined value (for example, 64) or greater. In the case in which the short edge of the transform block (TU) is the predetermined value or greater, for example, in the primary transform, a 32-point transform of the low-frequency component is applied (Zero-out). Also, in the case in which the short edge of the transform block is the predetermined value or greater, the secondary transform is applied only to one upper-left sub-block of the transform block.

Blocking artifacts may occur due to the simplification/non-simplification of the transform process described above (that is, whether or not the transform process is simplified) being different between blocks.

(3) Prediction Process (Newly Introduced Prediction Process)

In HEVC, a horizontal/vertical motion prediction process is adopted as the prediction process. In contrast, examples of newly introduced encoding processes in the prediction process include intra block copy (intra BC), affine motion compensation (MC) prediction, and position-dependent intra-prediction combination (PDPC).

For example, blocking artifacts may occur due to the application/non-application of intra BC (whether or not intra BC is applied) being different between blocks. Blocking artifacts may occur due to the application/non-application of affine MC (whether or not affine MC is applied) being different between blocks. Also, blocking artifacts may occur due to the application/non-application of PDPC (whether or not PDPC is applied) being different between blocks.

The above briefly describes several examples of the newly introduced encoding processes (encoding tools), but the newly introduced encoding processes (encoding tools) are not limited to the new block structures, the new transform processes, and the new prediction processes described above. For example, the newly introduced encoding processes (encoding tools) include new quantization processes, new filter processes, and the like.

3. DEBLOCKING FILTER

[3-1. Description of Existing Process]

Generally, in existing image encoding schemes such as HEVC/H.265, a determination of the need to apply a deblocking filter and a selection of the filter strength are performed on the basis of a boundary strength value bS of the block boundary. In HEVC for example, the need to apply a deblocking filter in units of boundaries is determined in units of 8×8 pixel blocks with respect to PU or TU boundaries, in accordance with a boundary strength value bS set for the block.

FIG. 8 is a table for explaining the setting of the boundary strength value bS in HEVC. As illustrated in FIG. 8, the boundary strength value bS in HEVC may be set in accordance with a condition A and a condition B like the following.

Condition A: Of the two blocks on either side of the block boundary, at least one block is in the intra-prediction mode Condition B: Condition A is false, and at least one of the following a condition B1 or a condition B2 is true (B1) Of the two blocks on either side of the block boundary, at least one block has non-zero transform coefficients (B2) The absolute value of the difference between the motion vectors (MVs) of the two blocks on either side of the block boundary is 1 pixel or greater, or, the reference picture of motion compensation is different or the number of motion vectors (MVs) is different For example, the boundary strength value bS in HEVC is set to 2 in the case in which condition A is true. Also, the boundary strength value bS in HEVC is set to 1 in the case in which condition B is true. Also, the boundary strength value bS in HEVC is set to 0 in the case in which condition A and condition B are false (that is, the case in which condition A, condition B1, and condition B2 are all false).

A luminance component deblocking filter process may be applied to blocks whose boundary strength value bS set as above is 1 or greater. Also, a chrominance component deblocking filter process may be applied to blocks whose boundary strength value bS set as above is 2.

Also, in HEVC, a quantization parameter Q related to the luminance component is computed on the basis of the boundary strength value bS set as above, and according to the quantization parameter Q, the determination of the need to apply the deblocking filter and the selection of the filter strength are performed in units of four lines. Also, as described above, since the chrominance component deblocking filter process is applied only in the case in which the boundary strength value bS is 2, the quantization parameter Q related to the chrominance component may be computed without using the boundary strength value bS.

[3-2. Exemplary Configuration of Deblocking Filter According to Embodiment]

This section describes one example of a configuration of the deblocking filter 24a in the image encoding apparatus 10 illustrated in FIG. 1 and the deblocking filter 24b in the image decoding apparatus 60 illustrated in FIG. 2. Note that the deblocking filter 24a and the deblocking filter 24b may share a common configuration. Consequently, in the following description, the deblocking filter 24a and the deblocking filter 24b will be collectively designated the deblocking filter 24 in cases in which it is not necessary to distinguish the two.

Likewise in the present embodiment, the process by the deblocking filter 24 includes a process of setting the boundary strength value bS described above, and the deblocking filter 24 performs the determination of the need to apply the deblocking filter and the selection of the filter strength on the basis of the boundary strength value bS. However, the deblocking filter 24 sets the boundary strength value bS on the basis of information associated with the newly introduced encoding processes.

At this point, the information associated with the newly introduced encoding processes may include the information of the transform identifiers (the primary transform identifier or the secondary transform identifier described above) for example. In addition, the information associated with the newly introduced encoding processes may also include information about the simplification/non-simplification of the transform process. Also, the information associated with the newly introduced encoding processes may include information about the application/non-application of intra BC, information about the application/non-application of affine MC, and information about the application/non-application of PDPC. The information associated with the encoding processes described above may be given in advance, provided to the deblocking filter 24 as encoding parameters, or specified by the deblocking filter 24 on the basis of information given in advance and the encoding parameters.

By setting the boundary strength value on the basis of information associated with the newly introduced encoding processes as above, it is possible to apply a deblocking filter appropriately even to block boundaries where blocking artifacts occur in association with the newly introduced encoding processes, and blocking artifacts can be reduced further.

(1) First Example of Setting Boundary Strength Value of Luminance Component

FIG. 9 is a table for explaining a first example of setting the boundary strength value of the luminance component according to the present embodiment. In the example illustrated in FIG. 9, the boundary strength value bS may be set according to the combination of the existing conditions A and B (existing conditions) associated with the setting of the boundary strength value bS in HEVC described with reference to FIG. 8 as well as the new conditions illustrated in FIG. 9. Note that the new conditions illustrated in FIG. 9 are all conditions based on information associated with the newly introduced encoding processes. Also, in the example illustrated in FIG. 9, the range of the boundary strength value bS is extended to be larger (wider) than the range of the boundary strength value bS in HEVC described with reference to FIG. 8, and the boundary strength value bS may be set to an extended value (a value not available to set in HEVC, namely 3 in the example illustrated in FIG. 9).

As illustrated in FIG. 9, the new conditions based on the information associated with the newly introduced encoding processes include the following conditions D, E, F, G, and H.

Condition D: The application/non-application of intra BC is different (applied to only one of the blocks) between the two blocks on either side of the block boundary Condition E: Of the two blocks on either side of the block boundary, the application/non-application of PDPC is different Condition F: At least one of the following a condition F1, a condition F2, or a condition F3 is true (F1) The Transform Set (primary transform identifier) is different between the two blocks on either side of the block boundary (F2) The NSST index (secondary transform identifier) is different between the two blocks on either side of the block boundary (F3) The simplification/non-simplification of the transform process is different (the transform process is simplified in only one of the blocks) between the two blocks on either side of the block boundary Condition G: The application/non-application of affine MC is different between the two blocks on either side of the block boundary Condition H: the simplification/non-simplification of the transform process is different between the two blocks on either side of the block boundary In the example illustrated in FIG. 9, in the case in which the existing condition A is true and any one of the new conditions D, E, and F is true, the boundary strength value bS is set to 3. Also, in the case in which the existing condition A is true and all of the new conditions D, E, and F are false, the boundary strength value bS is set to 2.

Also, in the example illustrated in FIG. 9, in the case in which the existing condition B is true and any one of the new conditions G and H is true, the boundary strength value bS is set to 2. Also, in the case in which the existing condition B is true and all of the new conditions G and H are false, the boundary strength value bS is set to 1.

Note that in the case in which the existing conditions A and B are false, the boundary strength value bS is set to 0.

(2) Second Example of Setting Boundary Strength Value of Luminance Component

FIG. 10 is a table for explaining a second example of setting the boundary strength value of the luminance component according to the present embodiment. In the example illustrated in FIG. 10, the boundary strength value bS is set according to the combination of conditions related to the prediction process and conditions associated with the transform process. Also, in the example illustrated in FIG. 10, the range of the boundary strength value bS is extended to be larger (wider) than the range of the boundary strength value bS in HEVC described with reference to FIG. 8, and the boundary strength value bS may be set to an extended value (a value not available to set in HEVC, namely 3 or 4 in the example illustrated in FIG. 10).

As illustrated in FIG. 10, the conditions related to the prediction process include a condition associated with the setting of the boundary strength value bS in HEVC and a condition based on the information associated with the newly introduced encoding processes. Also, as illustrated in FIG. 10, the conditions related to the transform process are all conditions based on the information associated with the newly introduced encoding processes.

As illustrated in FIG. 10, the conditions associated with the prediction process may include the following conditions I, J, and K.

Condition I: The application/non-application of intra BC is different between the two blocks on either side of the block boundary (condition based on information associated with newly introduced encoding processes)

Condition J: Condition I is true, and of the two blocks on either side of the block boundary, at least one block is in the intra-prediction mode Condition K: Conditions I and J are true, and at least one of the following a condition K1, a condition K2, or a condition K3 is true (K1) Of the two blocks on either side of the block boundary, at least one block has non-zero transform coefficients (K2) The absolute value of the difference between the motion vectors (MVs) of the two blocks on either side of the block boundary is 1 pixel or greater, or, the reference picture of motion compensation is different or the number of motion vectors (MVs) is different (K3) The application/non-application of affine MC is different between the two blocks on either side of the block boundary (condition based on information associated with newly introduced encoding processes)

Also, the conditions associated with the transform process illustrated in FIG. 10 correspond to the conditions F and H described with reference to FIG. 9.

In the example illustrated in FIG. 10, in the case in which the condition I related to the prediction process is true and the condition F related to the transform process is true, the boundary strength value bS is set to 4. Also, in the case in which the condition I related to the prediction process is true and the condition F related to the transform process is false, the boundary strength value bS is set to 3.

Also, in the example illustrated in FIG. 10, in the case in which the condition J related to the prediction process is true and the condition F related to the transform process is true, the boundary strength value bS is set to 3. Also, in the case in which the condition J related to the prediction process is true and the condition F related to the transform process is false, the boundary strength value bS is set to 2.

Also, in the example illustrated in FIG. 10, in the case in which the condition K related to the prediction process is true and the condition H related to the transform process is true, the boundary strength value bS is set to 2. Also, in the case in which the condition K related to the prediction process is true and the condition H related to the transform process is false, the boundary strength value bS is set to 1. Also, in the example illustrated in FIG. 10, in the case in which the condition K related to the prediction process is false and the condition H related to the transform process is true, the boundary strength value bS is set to 1. Note that in the case in which the condition K related to the prediction process is false and the condition H related to the transform process is false, the boundary strength value bS is set to 0.

(3) First Example of Setting Boundary Strength Value of Chrominance Component

FIG. 11 is a table for explaining a first example of setting a boundary strength value of the chrominance component according to the present embodiment. In the example illustrated in FIG. 11, the boundary strength value bS may be set on the basis of the condition A associated with the setting of the boundary strength value bS in HEVC described with reference to FIG. 8, as well as the new conditions illustrated in FIG. 11.

The new conditions illustrated in FIG. 11 correspond to the conditions D, E, and F described with reference to FIG. 9. Also, in the example illustrated in FIG. 11, the range of the boundary strength value bS is extended to be larger (wider) than the range of the boundary strength value bS in HEVC described with reference to FIG. 8, and the boundary strength value bS may be set to an extended value (a value not available to set in HEVC, namely 3 in the example illustrated in FIG. 11).

In the example illustrated in FIG. 11, in the case in which the existing condition A is true and any one of the new conditions D, E, and F is true, the boundary strength value bS is set to 3. Also, in the case in which the existing condition A is true and all of the new conditions D, E, and F are false, the boundary strength value bS is set to 2.

Note that as described later, in the present embodiment, since the deblocking filter for the chrominance component is applied only in the case in which the boundary strength value bS is 2 or greater, unlike the example illustrated in FIG. 9, in the example illustrated in FIG. 11, the boundary strength value bS preferably is set to 0 in the case in which the condition A is false.

(4) Second Example of Setting Boundary Strength Value of Chrominance Component

FIG. 12 is a table for explaining a second example of setting a boundary strength value of the chrominance component according to the present embodiment. In the example illustrated in FIG. 12, similarly to the second example of setting the boundary strength value of the luminance component described with reference to FIG. 10, the boundary strength value bS is set on the basis of conditions related to the prediction process and a condition associated with the transform process. Also, in the example illustrated in FIG. 12, the range of the boundary strength value bS is extended to be larger (wider) than the range of the boundary strength value bS in HEVC described with reference to FIG. 8, and the boundary strength value bS may be set to an extended value (a value not available to set in HEVC, namely 3 or 4 in the example illustrated in FIG. 12).

The conditions related to the prediction process illustrated in FIG. 12 correspond to the conditions I and J described with reference to FIG. 10. Also, the condition related to the transform process illustrated in FIG. 12 corresponds to the condition F described with reference to FIG. 9.

In the example illustrated in FIG. 12, in the case in which the condition I related to the prediction process is true and the condition F related to the transform process is true, the boundary strength value bS is set to 4. Also, in the case in which the condition I related to the prediction process is true and the condition F related to the transform process is false, the boundary strength value bS is set to 3.

Also, in the example illustrated in FIG. 12, in the case in which the condition J related to the prediction process is true and the condition F related to the transform process is true, the boundary strength value bS is set to 3. Also, in the case in which the condition J related to the prediction process is true and the condition F related to the transform process is false, the boundary strength value bS is set to 2.

Note that as described later, in the present embodiment, since the deblocking filter for the chrominance component is applied only in the case in which the boundary strength value bS is 2 or greater, unlike the example illustrated in FIG. 10, in the example illustrated in FIG. 12, the boundary strength value bS preferably is set to 0 in the case in which the conditions I and J are false.

(5) Detailed Configuration of Deblocking Filter

FIG. 13 is a block diagram illustrating one example of a detailed configuration of the deblocking filter 24 that realizes the process of setting the boundary strength value bS based on the information associated with the newly introduced encoding processes described above. Referring to FIG. 13, a boundary strength setting section 110, a filter application determination section 120, a strength selection section 130, a filtering section 140, and a determination control section 150 are included.

As described above, the boundary strength setting section 110 sets the boundary strength value bS on the basis of the information associated with the newly introduced encoding processes. The boundary strength setting section 110 may set the boundary strength value bS of the luminance component in accordance with the table illustrated in FIG. 9 or in accordance with the table illustrated in FIG. 10. Also, the boundary strength setting section 110 may set the boundary strength value bS of the chrominance component in accordance with the table illustrated in FIG. 11 or in accordance with the table illustrated in FIG. 12.

By having the boundary strength setting section 110 set the boundary strength value bS on the basis of the information associated with the newly introduced encoding processes, an appropriate deblocking filter is more likely to be applied to blocking artifacts that occur due to the influence of the newly introduced encoding processes, making it possible to reduce blocking artifacts further.

Note that the boundary strength value bS set by the boundary strength setting section 110 is provided to the determination control section 150 and used in the determination of the need to apply a deblocking filter in units of boundaries.

The filter application determination section 120 determines, in units of four lines orthogonal to a block boundary, whether or not to apply (the need to apply) a deblocking filter to two neighboring blocks neighboring across that boundary. For example, the filter application determination section 120 may determine whether or not to apply a deblocking filter by referencing pixel values on the first line and the fourth line. Also, the determination of the need to apply a deblocking filter by the filter application determination section 120 may be performed on the basis of the quantization parameter Q computed using the boundary strength value bS.

For example, the quantization parameter Q associated with the luminance component is computed according to the following formula using an average value $qP_L$ of the quantization parameter associated with the luminance component, the boundary strength value bS associated with the luminance component, and an offset value slice_tc_offset_div2.

$$Q=\text{Clip3}(0,53,qP_L+2*(bS-1)+(\text{slice\_tc\_offset\_div2}<<1))$$

Note that Clip3(a,b,c) denotes a process of clipping the value c to the range of $a \leq c \leq b$.

Also, as described above, in HEVC, the quantization parameter Q related to the chrominance component is computed without using the boundary strength value bS. However, in the present embodiment, since the range of values of the boundary strength value bS is extended such that the value of the boundary strength value bS may be set to a value greater than 2, it is desirable to also compute the quantization parameter Q associated with the chrominance component using the boundary strength value bS.

Accordingly, for example, the quantization parameter Q associated with the chrominance component may be computed according to the following formula using an average value $qP_C$ of the quantization parameter associated with the chrominance component, the boundary strength value bS associated with the chrominance component, and the offset value slice_tc_offset_div2.

$$Q=\text{Clip3}(0,53,qP_C+bS-2+(\text{slice\_tc\_offset\_div2}<<1))$$

Also, the quantization parameter Q associated with the chrominance component is not limited to the above formula calculation, and may also be computed as follows.

$$Q=\text{Clip3}(0,53,qP_C+2*(bS-2)+(\text{slice\_tc\_offset\_div2}<<1))$$

As above, by having the filter application determination section 120 compute the quantization parameter Q associated with the chrominance component on the basis of the boundary strength value bS associated with the chrominance component, the deblocking filter is more likely to be applied more appropriately, making it possible to reduce blocking artifacts further.

The filter application determination section 120 may also determine whether or not to apply the deblocking filter in units of four lines, on the basis of the quantization parameter Q obtained as described above. Note that such a determination of the need to apply the deblocking filter in units of four lines based on the quantization parameter Q may also be similar to the determination of the need to apply the deblocking filter in units of four lines in HEVC described in Non-Patent Literature 1.

For a block boundary that satisfies the deblocking filter application condition for example, the filter application determination section 120 causes the strength selection section 130 to select a filter strength and causes the filtering section 140 to perform filtering. On the other hand, for a block boundary that does not satisfy the deblocking filter application condition, the filter application determination section 120 skips the selection of a filter strength by the strength selection section 130 and the filtering by the filtering section 140.

The strength selection section 130 selects the strength of the deblocking filter to be applied to the block boundary by the filtering section 140. More specifically, the strength selection section 130 selects the strength of the filter for the block boundary for which the filter application determination section 120 has determined that the deblocking filter should be applied. Note that the selection of the strength of the filter by the strength selection section 130 may also be performed on the basis of the quantization parameter Q computed using the boundary strength value bS. Subsequently, the strength selection section 130 outputs information expressing the selected filter strength to the filtering section 140.

The filtering section 140 applies the deblocking filter to the luminance component and the chrominance component of pixels positioned near the block boundary, on the basis of the boundary strength value bS set by the boundary strength setting section 110 and the result of the determination by the filter application determination section 120. The configuration of the filter of the filtering section 140 preferably is similar to the filter in HEVC described in Non-Patent Literature 1. For example, the filtering section 140 applies the deblocking filter targeting a block boundary for which the filter application determination section 120 has determined that the deblocking filter should be applied.

Subsequently, the filtering section 140 successively outputs the filtered pixel values for pixels where the filter was applied, while outputting the pixel values from the input image for other pixels, as the pixel values of the output image.

The determination control section 150 controls the determination of the need to apply the deblocking filter. For example, the determination control section 150 determines the need to apply the deblocking filter in units of boundaries, in accordance with the boundary strength value bS set by the boundary strength setting section 110.

For example, with respect to a boundary for which the boundary strength value bS associated with the luminance component set by the boundary strength setting section 110 is 0, the determination control section 150 may cause the filter application determination section 120 to skip the determination of the need to apply the deblocking filter. Also, with respect to a boundary for which the boundary strength value bS associated with the chrominance component set by the boundary strength setting section 110 is less than 2, the determination control section 150 may cause the filter application determination section 120 to skip the determination of the need to apply the deblocking filter.

[3-3. Process Flow]

Figure 14:
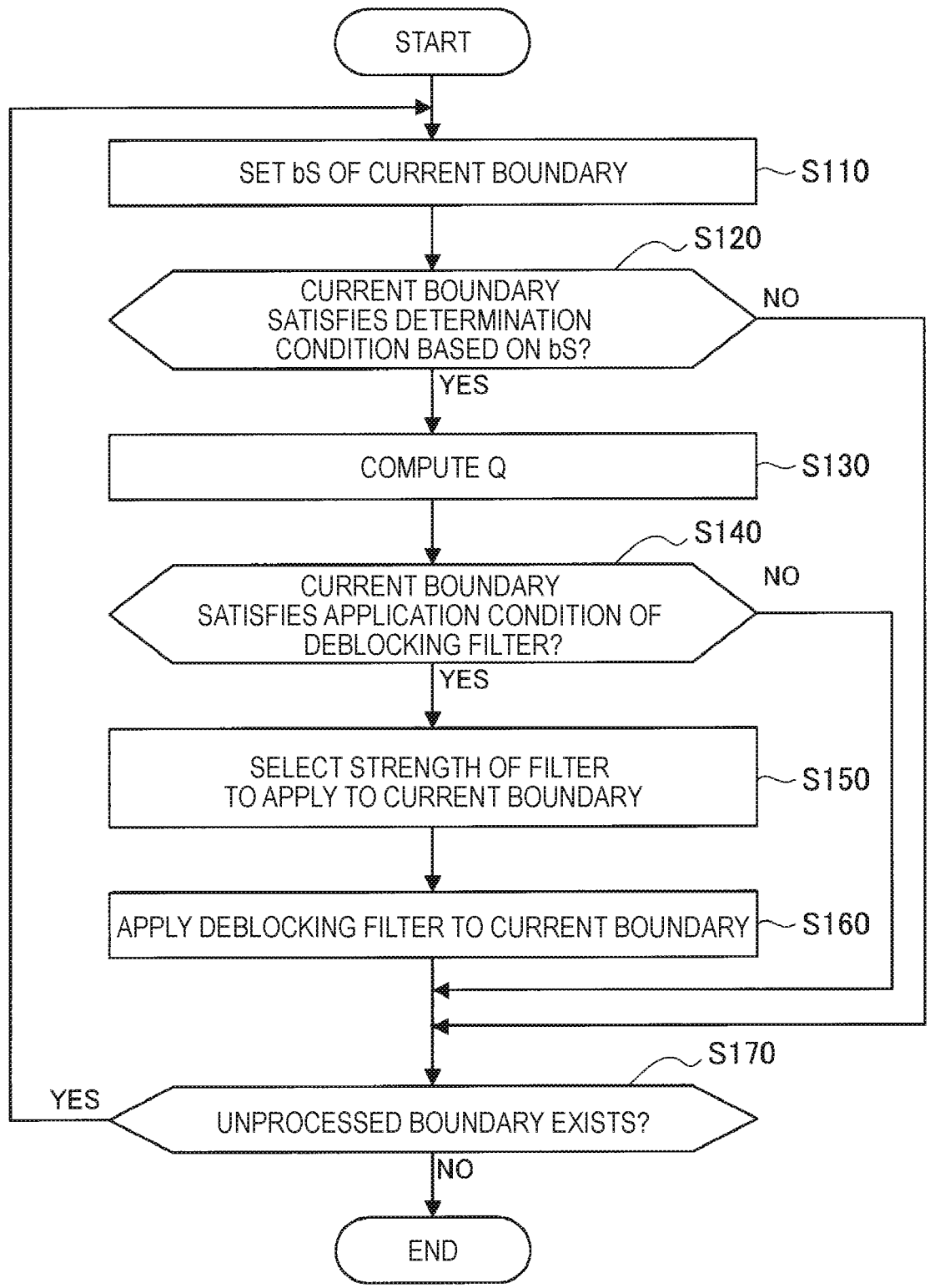
FIG. 14 is a flowchart illustrating one example of the flow of a process by the deblocking filter according to the embodiment.

FIG. 14 is a flowchart illustrating one example of the flow of a process by the deblocking filter 24 according to an embodiment of the present disclosure. The process from step S110 to step S180 in FIG. 14 is repeated for each of all block boundaries in an input image.

First, for a single boundary to process (hereinafter designated the current boundary), the boundary strength setting section 110 sets the boundary strength value bS on the basis of information associated with the newly introduced encoding processes (S110).

Next, the determination control section 150 determines the need to apply the deblocking filter in units of boundaries, in accordance with the boundary strength value bS set by the boundary strength setting section 110 (step S120). At this point, in the case in which the determination condition in units of boundaries is not satisfied, the subsequent process from step S130 to step S170 is skipped. On the other hand, in the case in which the determination condition in units of boundaries is satisfied, the process proceeds to step S130.

In step S130, the filter application determination section 120 computes the quantization parameter Q using the boundary strength value bS. Note that the computation of the quantization parameter Q may also be performed by a section other than the filter application determination section 120.

In step S140, the filter application determination section 120 determines, in units of four lines orthogonal to the current boundary, whether or not to apply (the need to apply) the deblocking filter. The filter application determination section 120 may also determine whether or not to apply a deblocking filter by referencing pixel values on the first line and the fourth line from among the four lines. At this point, in the case in which the deblocking filter application condition is not satisfied, the subsequent process of step S150 and step S160 is skipped. On the other hand, in the case in which the deblocking filter application condition is satisfied, the process proceeds to step S150.

In step S150, the strength selection section 130 selects the strength of the filter that should be applied to the current boundary (step S150).

Subsequently, the filtering section 140 applies the deblocking filter to the current boundary (step S160).

In step S170, in the case in which an unprocessed boundary remains in the input image (YES in step S170), a new target boundary is set, and the process returns to step S110. In the case in which no unprocessed boundaries remain, the process ends for the input image.

5. EXEMPLARY HARDWARE CONFIGURATION

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 15:
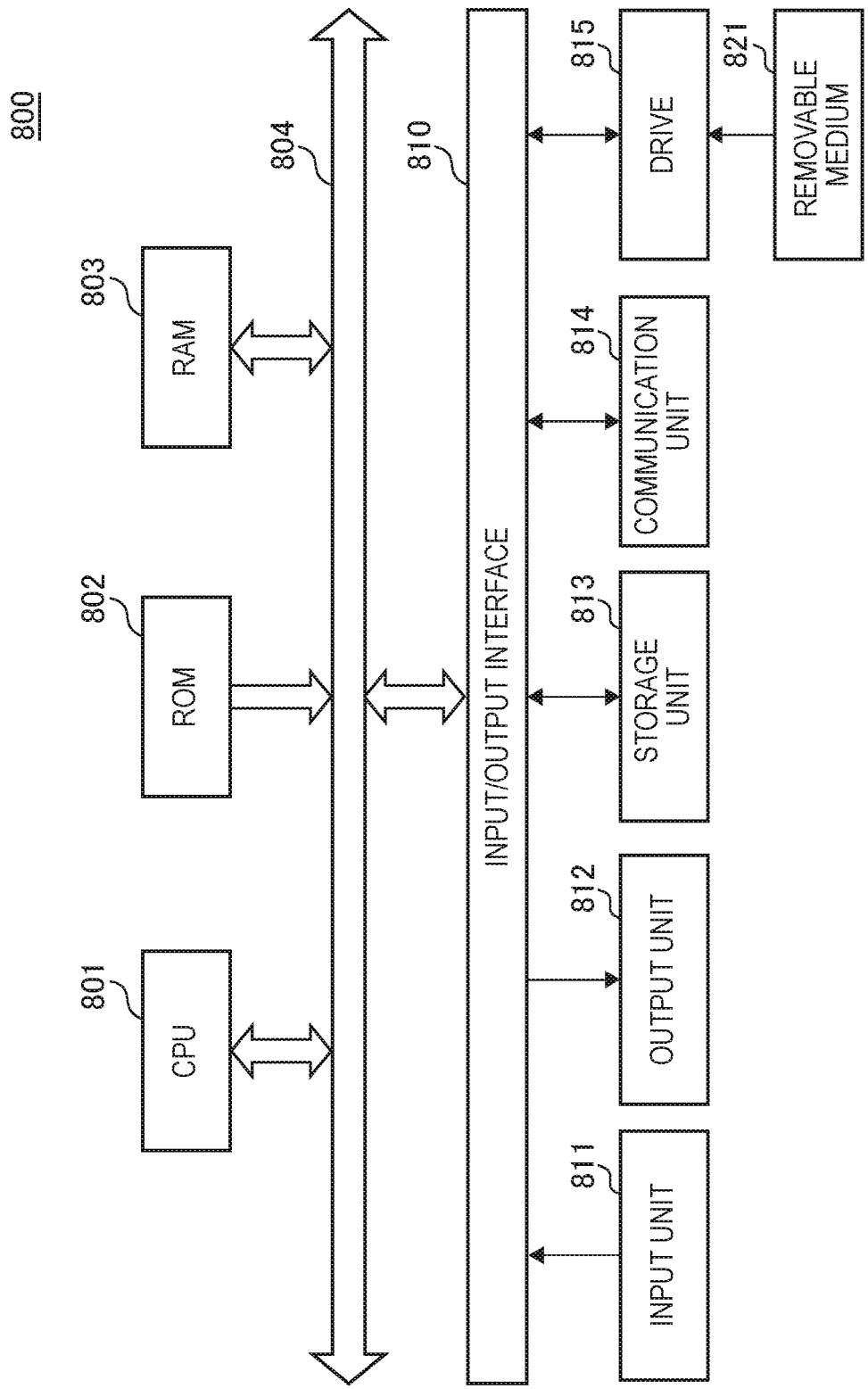
FIG. 15 is a block diagram illustrating a principal configuration example of a computer.

FIG. 15 is a block diagram illustrating an exemplary hardware configuration of a computer that executes the series of processes described above according to a program.

In the computer 800 illustrated in FIG. 15, a central processing unit (CPU) 801, read-only memory (ROM) 802, and random access memory (RAM) 803 are interconnected through a bus 804.

Additionally, an input/output interface 810 is also connected to the bus 804. An input unit 811, an output unit 812, a storage unit 813, a communication unit 814, and a drive 815 are connected to the input/output interface 810.

The input unit 811 includes a keyboard, a mouse, a microphone, a touch panel, an input terminal, and the like, for example. The output unit 812 includes a display, a speaker, an output terminal, and the like, for example. The storage unit 813 includes a hard disk, a RAM disk, non-volatile memory, and the like, for example. The communication unit 814 includes a network interface, for example. The drive 815 drives a removable medium 821 such as a magnetic disk, an optical disc, a magneto-optical disc, or semiconductor memory.

In a computer configured as above, the series of processes described above are performed by having the CPU 801 load a program stored in the storage unit 813 into the RAM 803 via the input/output interface 810 and the bus 804, and execute the program, for example. Additionally, data required for the CPU 801 to execute various processes and the like is also stored in the RAM 803 as appropriate.

The program executed by the computer (CPU 801) may be applied by being recorded onto the removable medium 821 as an instance of packaged media or the like, for example. In this case, the program may be installed in the storage unit 813 via the input/output interface 810 by inserting the removable medium 821 into the drive 815.

In addition, the program may also be provided via a wired or wireless transmission medium such as a local area network, the Internet, or digital satellite broadcasting. In this case, the program may be received by the communication unit 814 and installed in the storage unit 813.

Otherwise, the program may also be preinstalled in the ROM 802 or the storage unit 813.

6. APPLICATION EXAMPLES

The image encoding apparatus 10 and the image decoding apparatus 60 according to the above-described embodiments can be applied to various electronic apparatuses such as: transmitters or receivers for satellite broadcasting, wired broadcasting such as cable TV, distribution on the Internet and distribution to terminals through cellular communication; recording devices which record images on media such as optical discs, magnetic disks, and flash memories; or reproduction devices which reproduce images from the foregoing storage media.

(1) First Application Example: Television Receiver

Figure 16:
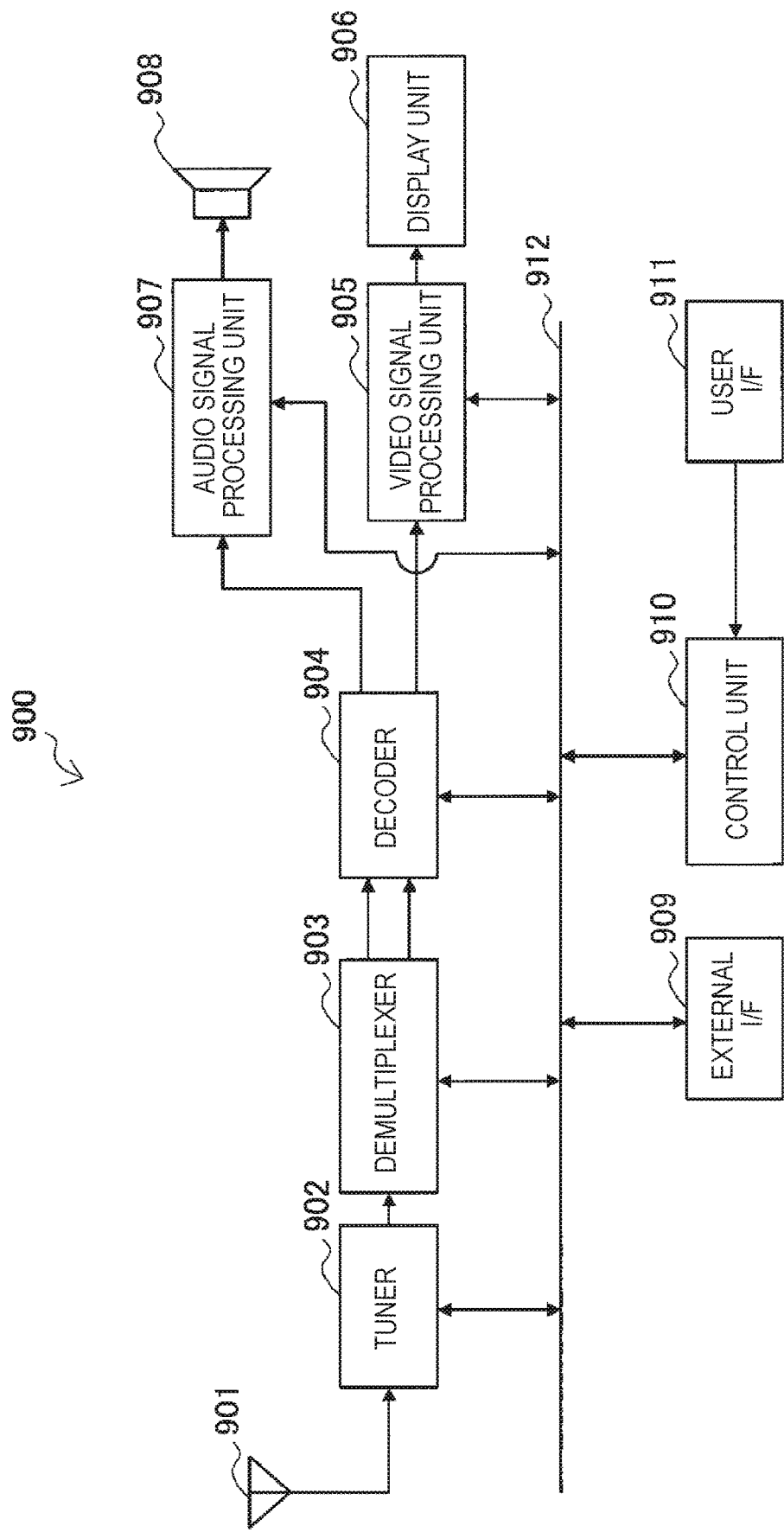
FIG. 16 is a block diagram illustrating an example of a schematic configuration of a television apparatus.

FIG. 16 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface (I/F) 909, a control unit 910, a user interface (I/F) 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission section of the television apparatus 900 which receives an encoded stream in which images are encoded.

The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an organic electroluminescence display (OLED), etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission sections of the television apparatus 900 which receives an encoded stream in which images are encoded.

The control unit 910 has a processor such as a CPU and a memory such as a RAM and a ROM. The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface section 911.

The user interface section 911 is connected to the control unit 910. The user interface section 911 includes, for example, buttons and switches with which a user operates the television apparatus 900, a reception unit for remote control signals, and the like. The user interface section 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 configured in this way, the decoder 904 may also include the functions of the image decoding apparatus 60 described above. In other words, the decoder 904 may be configured to decode encoded data according to the method described in each of the above embodiments. With this arrangement, the television apparatus 900 is able to reduce blocking artifacts further.

Also, in the television apparatus 900 configured in this way, the video signal processing unit 905 may be able to encode image data provided from the decoder 904, and cause the obtained encoded data to be output externally to the television apparatus 900 through external interface 909. Additionally, the video signal processing unit 905 may also include the functions of the image encoding apparatus 10 described above. In other words, the video signal processing unit 905 may be configured to encode image data provided from the decoder 904 according to the method described in each of the above embodiments. With this arrangement, the television apparatus 900 is able to reduce blocking artifacts further.

(2) Second Application Example: Mobile Telephone

Figure 17:
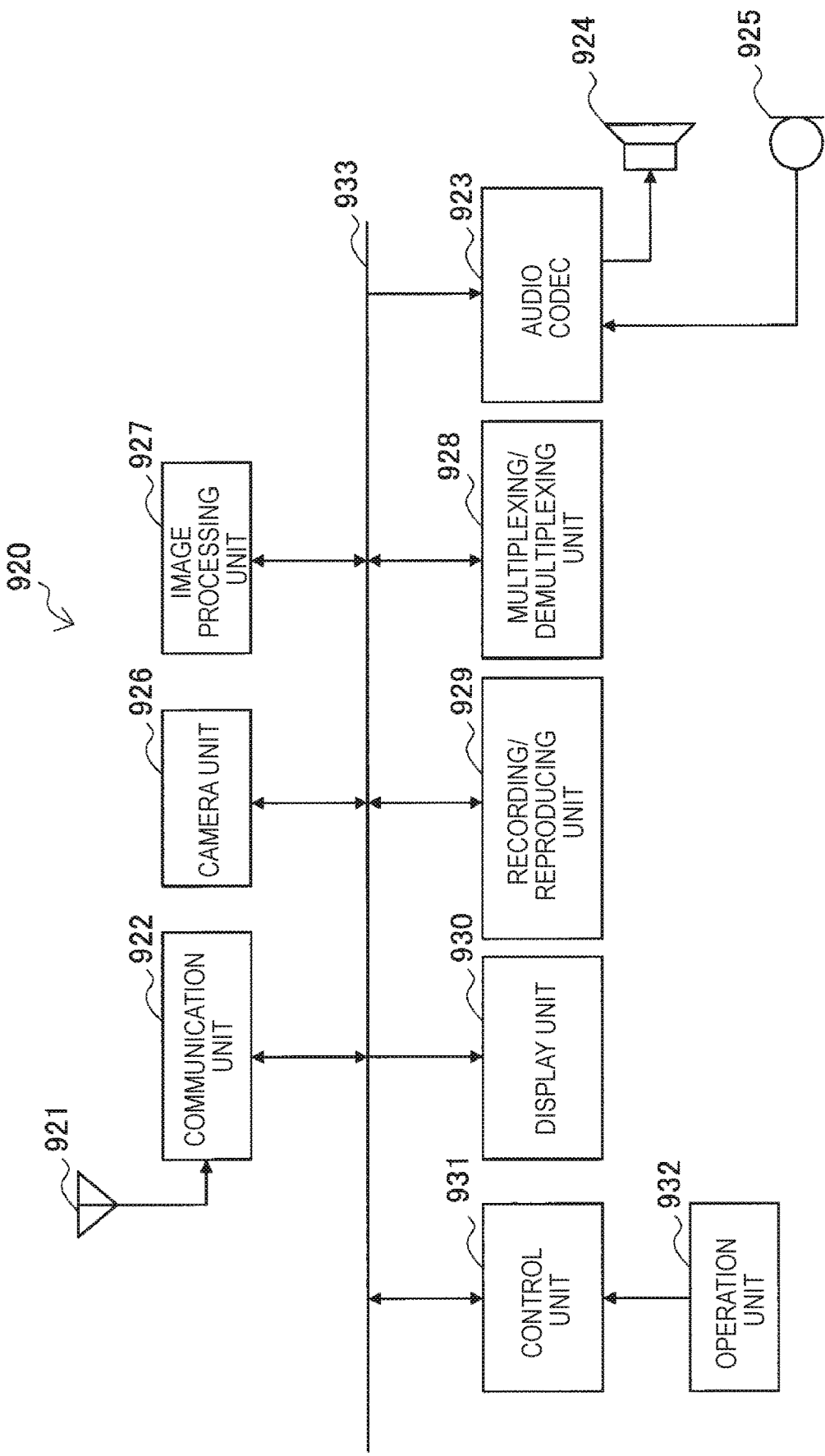
FIG. 17 is a block diagram illustrating an example of a schematic configuration of a mobile telephone.

FIG. 17 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as supplies the electronic mail data to a storage medium of the recording/reproducing unit 929 to cause the data to be recorded in the medium.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the photography mode, for example, the camera unit 926 images an object to generate image data and outputs the generated image data to the image processing unit 927. The image processing unit 927 encodes the image data input from the camera unit 926 and supplies an encoded stream to the storage medium of the recording/reproducing unit 929 to cause the encoded stream to be recorded in the medium.

Furthermore, in the image display mode, the recording/reproducing unit 929 reads out an encoded stream recorded on a storage medium, and outputs to the image processing unit 927. The image processing unit 927 decodes the encoded stream input from the recording/reproducing unit 929, supplies image data to the display unit 930, and causes the image to be displayed.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile telephone 920 configured in this way, the image processing unit 927 may include the functions of the image encoding apparatus 10 described above, for example. In other words, the image processing unit 927 may be configured to encode image data according to the method described in each of the above embodiments. With this arrangement, the mobile telephone 920 is able to reduce blocking artifacts further.

In addition, in the mobile telephone 920 configured in this way, the image processing unit 927 may include the functions of the image decoding apparatus 60 described above, for example. In other words, the image processing unit 927 may be configured to decode encoded data according to the method described in each of the above embodiments. With this arrangement, the mobile telephone 920 is able to reduce blocking artifacts further.

(3) Third Application Example: Recording/Reproducing Apparatus

Figure 18:
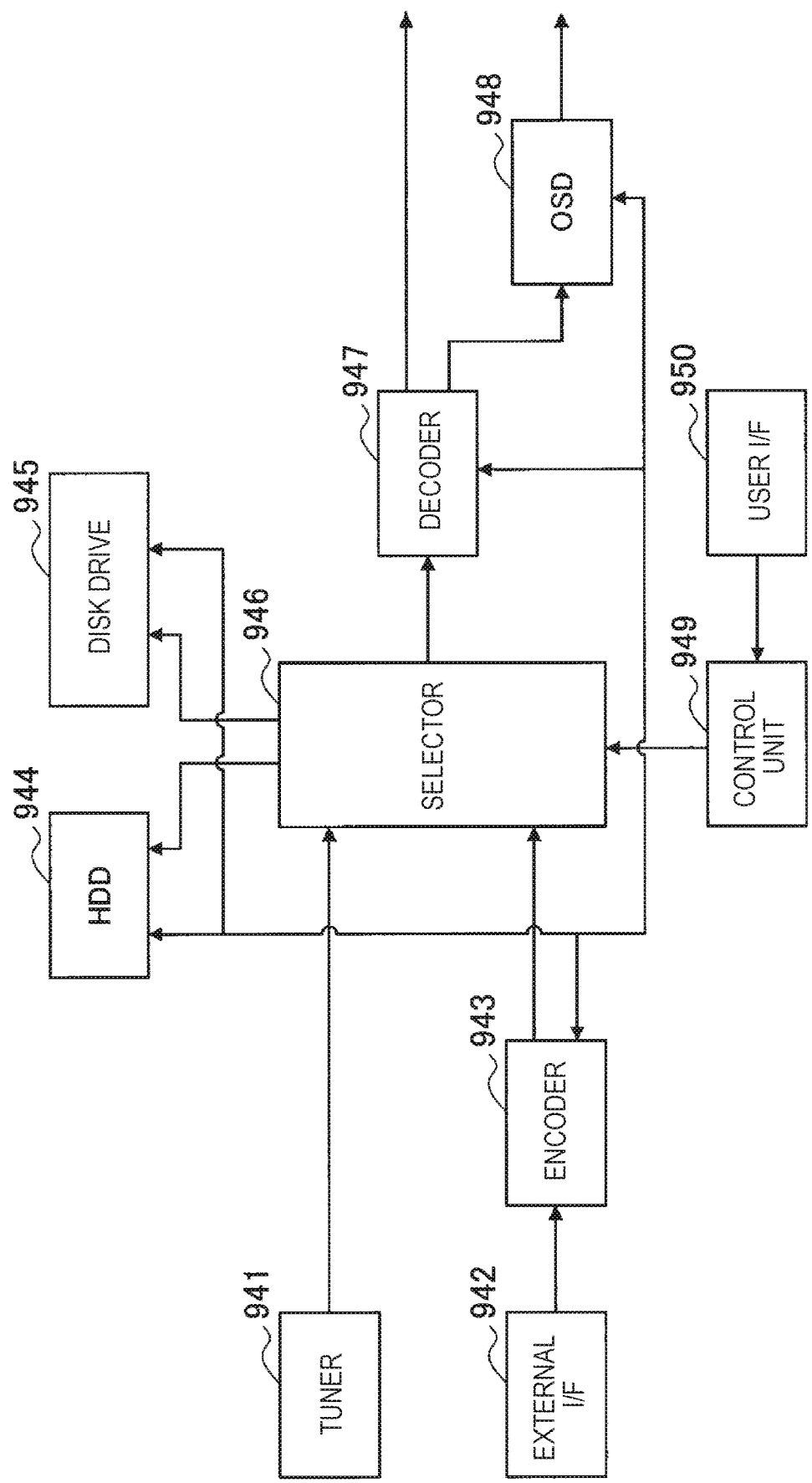
FIG. 18 is a block diagram illustrating an example of a schematic configuration of a recording/reproducing apparatus.

FIG. 18 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing apparatus 940.

The external interface 942 is an interface which connects the recording/reproducing apparatus 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing apparatus 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when the video and the audio are reproduced.

The disk drive 945 records and reads data into/from a recording medium attached to the disk drive. The recording medium attached to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface 950, for example.

The user interface 950 is connected to the control unit 949. The user interface 950 includes a button and a switch for a user to operate the recording/reproducing apparatus 940 as well as a reception part which receives a remote control signal, for example. The user interface 950 detects a user operation through these components to generate an operation signal, and outputs the generated operation signal to the control unit 949.

In the recording/reproducing apparatus 940 configured in this way, the encoder 943 includes the functions of the image encoding apparatus 10 according to the embodiments described above. In addition, the decoder 947 includes the functions of the image decoding apparatus 60 according to the embodiments described above. With this arrangement, the recording/reproducing apparatus 940 is able to reduce blocking artifacts further.

(4) Fourth Application Example: Imaging Apparatus

Figure 19:
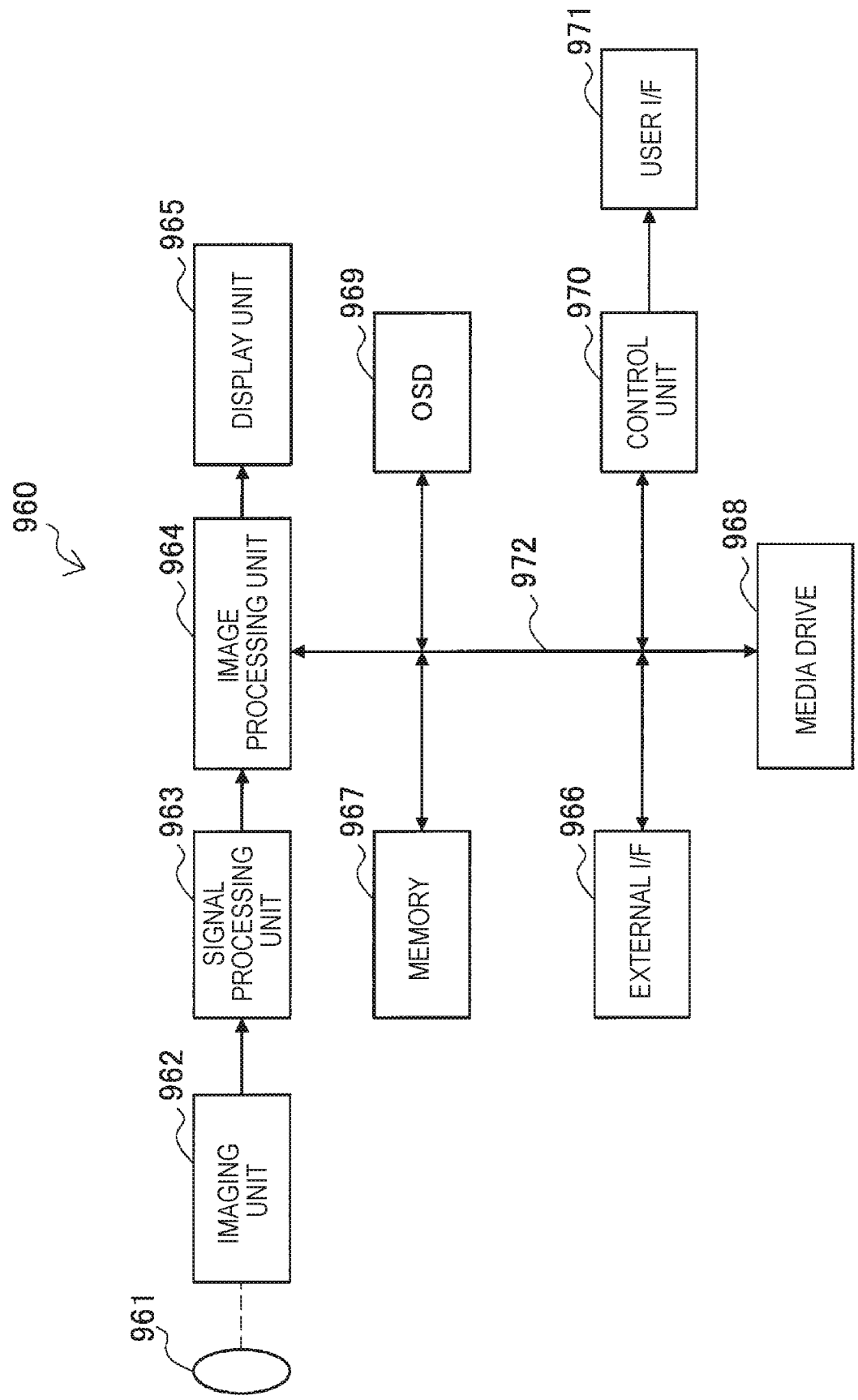
FIG. 19 is a block diagram illustrating an example of a schematic configuration of an imaging apparatus.

FIG. 19 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a CCD or a CMOS and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD 969 onto the image that is output on the display unit 965.

The OSD 969 generates an image of a GUI such as a menu, buttons, or a cursor and outputs the generated image to the image processing unit 964.

The external interface 966 is configured as a USB input/output terminal, for example. The external interface 966 connects the imaging apparatus 960 with a printer when printing an image, for example. Moreover, a drive is connected to the external interface 966 as needed. A removable medium such as a magnetic disk or an optical disk is attached to the drive, for example, so that a program read from the removable medium can be installed to the imaging apparatus 960. The external interface 966 may also be configured as a network interface that is connected to a network such as a LAN or the Internet. That is, the external interface 966 has a role as transmission means in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface 971, for example.

The user interface 971 is connected to the control unit 970. The user interface 971 includes buttons and switches for a user to operate the imaging apparatus 960, for example. The user interface 971 detects a user operation through these components to generate an operation signal, and outputs the generated operation signal to the control unit 970.

In the imaging apparatus 960 configured in this way, the image processing unit 964 includes the functions of the image encoding apparatus 10 and the image decoding apparatus 60 according to the embodiments described above. With this arrangement, the imaging apparatus 960 is able to reduce blocking artifacts further.

(5) Fifth Application Example: Video Set

Figure 20:
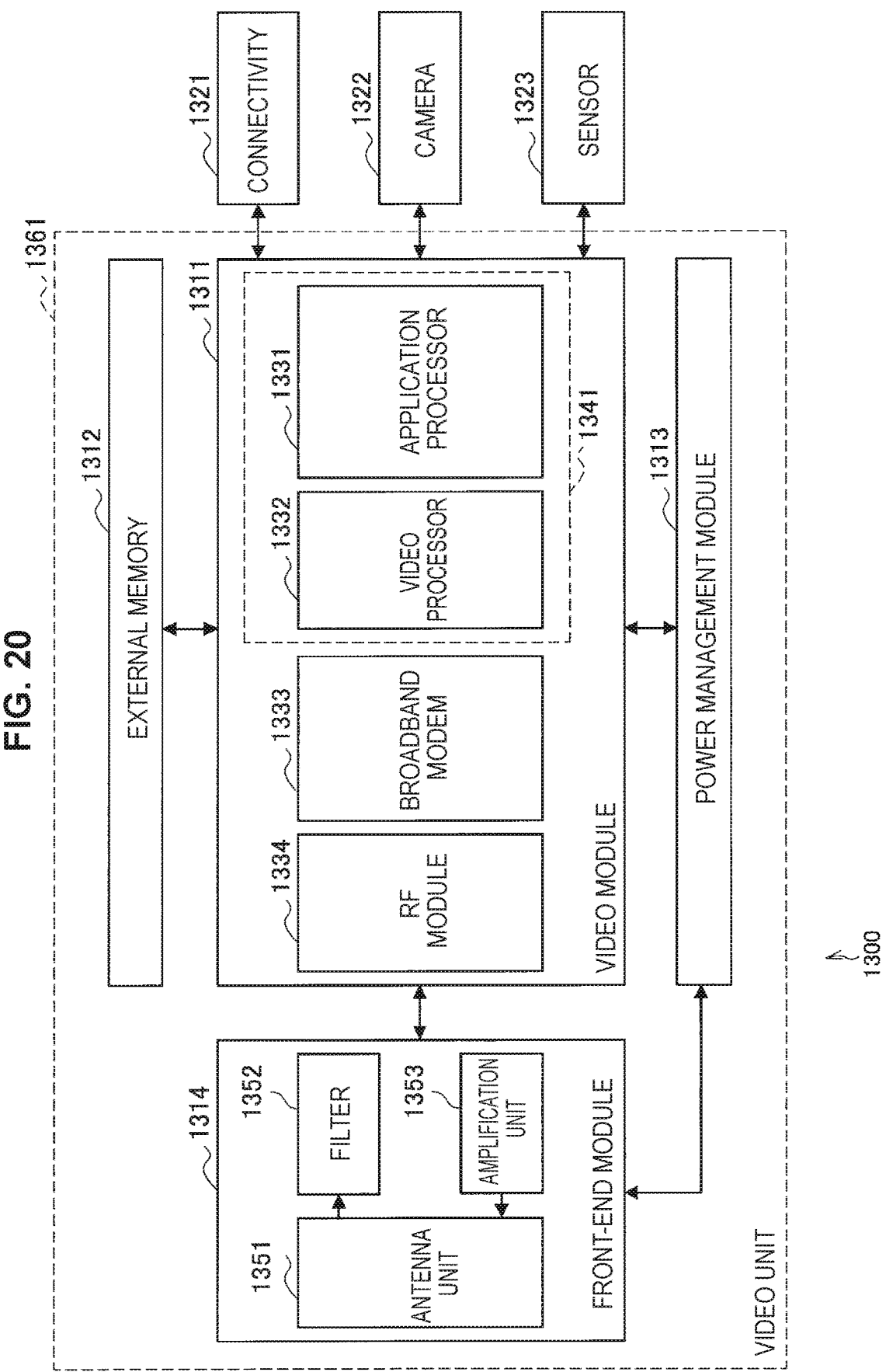
FIG. 20 is a block diagram illustrating one example of a schematic configuration of a video set.

Additionally, the present technology may also be implemented as any kind of configuration installed in any apparatus or an apparatus included in a system, such as a processor provided as a large-scale integration (LSI) chip or the like, a module that uses multiple processors or the like, a unit that uses multiple modules or the like, a set that further adds other functions to a unit (that is, a configuration of a part of an apparatus), or the like. FIG. 20 illustrates one example of a schematic configuration of a video set applying the present technology.

Recently, electronic devices are becoming more multi-functional, and in the development and manufacture of such electronic devices, in the case of implementing a partial configuration thereof for sale, offer, or the like, it has become commonplace not only to carry out the implementation as a configuration that includes a single function, but also to combine multiple configurations that include related functions and carry out the implementation as a single set including multiple functions.

The video set 1300 illustrated in FIG. 20 is such a multifunctional configuration, and is a combination of a device that includes functions related to image encoding and decoding (either one, or both) with a device that includes other functions related to such functions.

As illustrated in FIG. 20, the video set 1300 includes a module group such as a video module 1311, external memory 1312, a power management module 1313, and a front-end module 1314, and a device that includes related functions such as connectivity 1321, a camera 1322, and a sensor 1323.

A module is a part that collects several interrelated partial functions into a unified function. The specific physical configuration may be any configuration, but for example, it is conceivable to dispose and integrate multiple processors with respective functions, electronic circuit elements such as resistors and capacitors, other devices, and the like onto a circuit board or the like. It is also conceivable to combine a module with another module, processor, or the like to create a new module.

In the case of the example in FIG. 20, the video module 1311 is a combination of configurations that include functions related to image processing, and includes an application processor, a video processor, a broadband modem 1333, and an RF module 1334.

The processor is an integration of configurations having predetermined functions into a semiconductor chip as a system on a chip (SoC), and may also be designated a large-scale integration (LSI) chip or the like, for example. The configurations having predetermined functions may be logic circuits (hardware configurations), but may also be a CPU, ROM, RAM, and the like as well as a program executed using these (software configurations), and may also be a combination of both. For example, a processor may include logic circuits and CPU, ROM, RAM, and the like, and may be configured to realize a subset of the functions with the logic circuits (hardware configurations) while realizing other functions with programs (software configurations) executed on the CPU.

The application processor 1331 in FIG. 20 is a processor that executes an application related to image processing. To realize a predetermined function, the application executed in the application processor 1331 is able to not only execute computational processing, but is also able to control configurations inside and outside the video module 1311, such as the video processor 1332, for example, as necessary.

The video processor 1332 is a processor that includes functions related to image encoding/decoding (either one, or both).

The broadband modem 1333 performs digital modulation and the like to convert data (a digital signal) transmitted by wired or wireless (or both) broadband communication performed over a broadband connection such as the Internet or the public telephone network into an analog signal, and also performs demodulation to convert an analog signal received by such broadband communication into data (a digital signal). The broadband modem 1333 processes any kind of information, such as image data processed by the video processor 1332, a stream in which image data is encoded, application programs, and settings data, for example.

The RF module 1334 is a module that performs frequency conversion, modulation/demodulation, amplification, filter processing, and the like on radio frequency (RF) signals transmitted and received through an antenna. For example, the RF module 1334 generates an RF signal by performing frequency conversion and the like on a baseband signal generated by the broadband modem 1333. Also, for example, the RF module 1334 generates a baseband signal by performing frequency conversion and the like on an RF signal received via the front-end module 1314.

Note that as illustrated by the dashed line 1341 in FIG. 20, the application processor 1331 and the video processor 1332 may also be unified and configured as a single processor.

The external memory 1312 is a module provided externally to the video module 1311 that includes a storage device utilized by the video module 1311. The storage device of the external memory 1312 may be realized by any kind of physical configuration, but since the storage device typically is used to store large amounts of data such as image data in units of frames, it is desirable to realize the storage device with relatively inexpensive and high-capacity semiconductor memory such as dynamic random access memory (DRAM), for example.

The power management module 1313 manages and controls the supply of power to the video module 1311 (each configuration inside the video module 1311).

The front-end module 1314 is a module that provides a front-end function (a circuit on the antenna-side transmit/receive port) to the RF module 1334. As illustrated in FIG. 20, the front-end module 1314 includes an antenna unit 1351, a filter 1352, and an amplification unit 1353, for example.

The antenna unit 1351 includes an antenna that transmits and receives wireless signals, and a peripheral configuration thereof. The antenna unit 1351 transmits a signal supplied from the amplification unit 1353 as a wireless signal, and supplies a received wireless signal to the filter 1352 as an electric signal (RF signal). The filter 1352 performs filter processing and the like on the RF signal received through the antenna unit 1351, and supplies the processed RF signal to the RF module 1334. The amplification unit 1353 amplifies and supplies the RF signal supplied from the RF module 1334 to the antenna unit 1351.

The connectivity 1321 is a module that includes functions related to external connections. The physical configuration of the connectivity 1321 may be any configuration. For example, the connectivity 1321 includes a configuration having a communication function other than the communication standard supporting by the broadband modem 1333, an external input/output terminal, or the like.

For example, the connectivity 1321 may include a module having a communication function conforming to a wireless communication standard such as Bluetooth (registered trademark), IEEE 802.11 (for example, Wireless Fidelity (Wi-Fi (registered trademark))), near field communication (NFC), or Infrared Data Association (IrDA), and an antenna or the like that transmits and receives signals conforming to the standard. Also, for example, the connectivity 1321 may include a module having a communication function conforming to a wired communication function such as Universal Serial Bus (USB) or High-Definition Multimedia Interface (HDMI)(registered trademark), and a port conforming to the standard. Furthermore, for example, the connectivity 1321 may include a function of transmitting another kind of data (signal), such as an analog input/output terminal.

Note that the connectivity 1321 may include the transmission destination device of the data (signal). For example, the connectivity 1321 may include a drive (not only a drive for removable media, but also including a hard disk, a solid-state drive (SSD), network-attached storage (NAS), and the like) that reads and writes data with respect to a recording medium such as a magnetic disk, an optical disc, a magneto-optical disc, or semiconductor memory. Also, the connectivity 1321 may include devices (such as a monitor and a speaker) that output images and sound.

The camera 1322 is a module that has a function of imaging a subject and obtaining image data of the subject. The image data obtained by the imaging by the camera 1322 is supplied to the video processor 1332 and encoded, for example.

The sensor 1323 is a module having any type of sensor function, such as a sound sensor, an ultrasonic sensor, a light sensor, an illumination sensor, an infrared sensor, an image sensor, a rotation sensor, an angle sensor, an angular velocity sensor, a speed sensor, an acceleration sensor, an inclination sensor, a magnetic field sensor, a shock sensor, or a temperature sensor, for example. Data detected by the sensor 1323 is supplied to the application processor 1331 and utilized by an application and the like, for example.

The configurations described as a module above may also be realized as a processor, while conversely, the configurations described as a processor may also be realized as a module.

In the video set 1300 with a configuration like the above, the present technology can be applied to the video processor 1332 as described later. Consequently, the video set 1300 may be carried out as a set applying the present technology.

Figure 21:
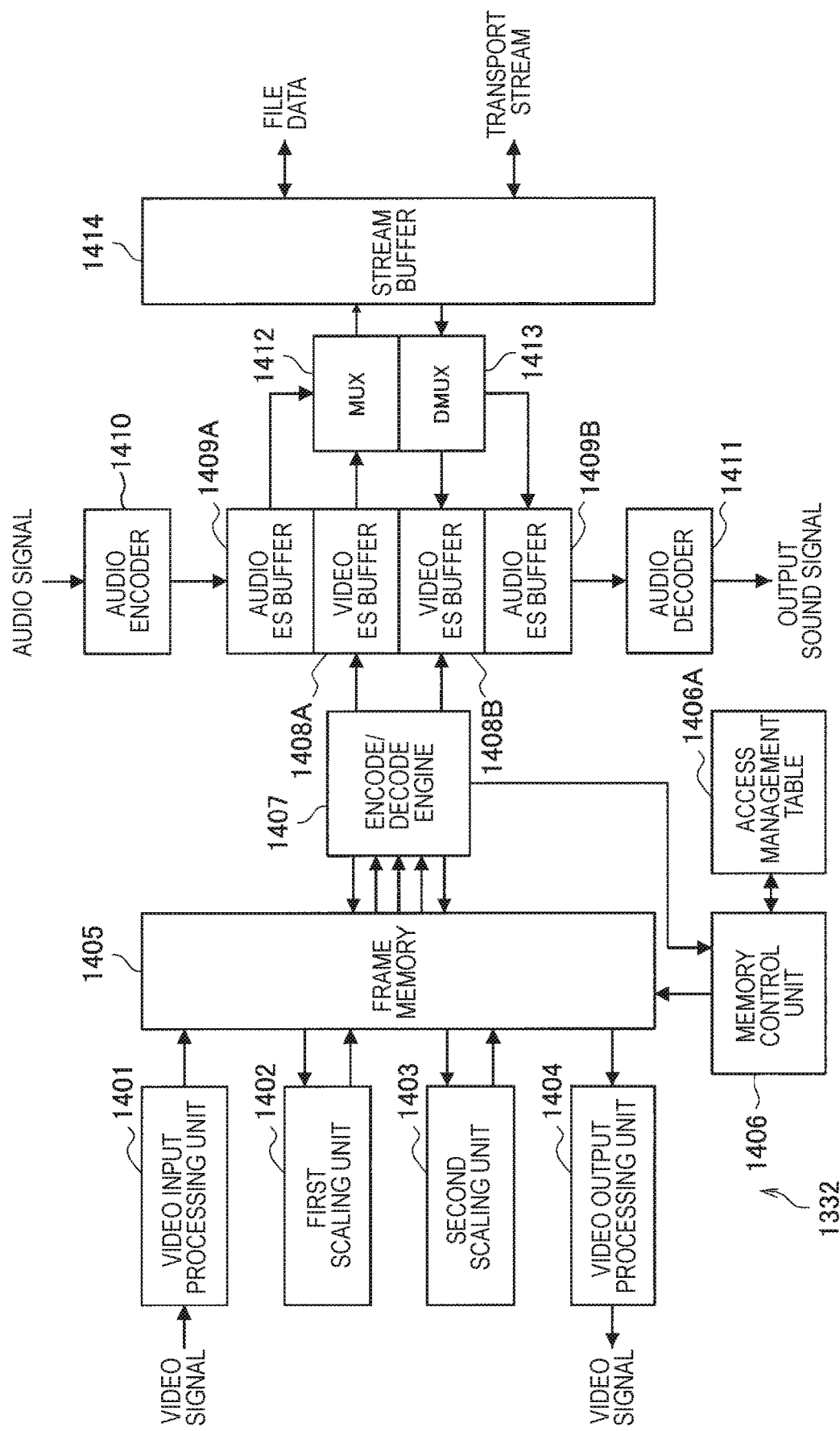
FIG. 21 is a block diagram illustrating one example of a schematic configuration of a video processor.

(Exemplary Configuration of Video Processor) FIG. 21 illustrates one example of a schematic configuration of the video processor 1332 (FIG. 20) applying the present technology.

In the case of the example in FIG. 21, the video processor 1332 includes a function of receiving the input of a video signal and an audio signal and encoding these signals according to a predetermined method, and a function of decoding encoded video data and audio data, and reproducing and outputting a video signal and an audio signal.

As illustrated in FIG. 21, the video processor 1332 includes a video input processing unit 1401, a first image enlargement/reduction unit 1402, a second image enlargement/reduction unit 1403, a video output processing unit 1404, frame memory 1405, and a memory control unit 1406. Also, the video processor 1332 includes an encode/decode engine 1407, video elementary stream (ES) buffers 1408A and 1408B, and audio ES buffers 1409A and 1409B. Additionally, the video processor 1332 includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 20) or the like, for example, and converts the video signal into digital image data. The first image enlargement/reduction unit 1402 performs format conversion, image enlargement/reduction processing, and the like on the image data. The second image enlargement/reduction unit 1403 performs a process of enlarging or reducing the image according to the format at the destination to which to output through the video output processing unit 1404, format conversion and image enlargement/reduction processing similar to the first image enlargement/reduction unit 1402, and the like on the image data. The video output processing unit 1404 performs format conversion, conversion to an analog signal, and the like on the image data, and outputs the result to the connectivity 1321 for example as a reproduced video signal.

The frame memory 1405 is memory for image data shared by the video input processing unit 1401, the first image enlargement/reduction unit 1402, the second image enlargement/reduction unit 1403, the video output processing unit 1404, and the encode/decode engine 1407. The frame memory 1405 is realized as semiconductor memory such as DRAM, for example.

The memory control unit 1406 receives a synchronization signal from the encode/decode engine 1407, and controls the access and writes and reads to the frame memory 1405 in accordance with an access schedule of access to the frame memory 1405 written in an access management table 1406A. The access management table 1406A is updated by the memory control unit 1406 according to processes executed by the encode/decode engine 1407, the first image enlargement/reduction unit 1402, the second image enlargement/reduction unit 1403, and the like.

The encode/decode engine 1407 executes a process of encoding image data as well as a process of decoding a video stream, which is data in which image data is encoded. For example, the encode/decode engine 1407 encodes image data read from the frame memory 1405, and successively writes the encoded data to the video ES buffer 1408A as a video stream. Also, for example, the encode/decode engine 1407 successively reads and decodes a video stream from the video ES buffer 1408B, and writes the decoded data to the frame memory 1405 as image data. During this encoding and decoding, the encode/decode engine 1407 uses the frame memory 1405 as a work area. Also, the encode/decode engine 1407 outputs a synchronization signal to the memory control unit 1406 at the timing of starting the process for each macroblock, for example.

The video ES buffer 1408A buffers and supplies a video stream generated by the encode/decode engine 1407 to the multiplexer (MUX) 1412. The video ES buffer 1408B buffers and supplies a video stream supplied from the demultiplexer (DMUX) 1413 to the encode/decode engine 1407.

The audio ES buffer 1409A buffers and supplies an audio stream generated by the audio encoder 1410 to the multiplexer (MUX) 1412. The audio ES buffer 1409B buffers and supplies an audio stream supplied from the demultiplexer (DMUX) 1413 to the audio decoder 1411.

The audio encoder 1410 for example digitally converts an audio signal input from the connectivity 1321 or the like, for example, and encodes the audio signal according to a predetermined method such as the MPEG Audio method or the AudioCode number 3 (AC3) method, for example. The audio encoder 1410 successively writes an audio stream, which is data in which an audio signal is encoded, to the audio ES buffer 1409A. The audio decoder 1411 decodes an audio stream supplied from the audio ES buffer 1409B, performs conversion to an analog signal and the like, for example, and supplies the result to the connectivity 1321 and the like for example as a reproduced audio signal.

The multiplexer (MUX) 1412 multiplexes a video stream and an audio stream. The multiplexing method (that is, the format of the bit stream generated by multiplexing) may be any method. Additionally, during this multiplexing, the multiplexer (MUX) 1412 is also able to add predetermined header information or the like to the bit stream. In other words, the multiplexer (MUX) 1412 is able to convert the format of the streams by multiplexing. For example, by multiplexing a video stream and an audio stream, the multiplexer (MUX) 1412 converts the streams to a transport stream, which is a bit stream in a format for transmission. Also, for example, by multiplexing a video stream and an audio stream, the multiplexer (MUX) 1412 converts the streams to data (file data) in a file format for recording.

The demultiplexer (DMUX) 1413 demultiplexes a bit stream in which a video stream and an audio stream are multiplexed, according to a method corresponding to the multiplexed by the multiplexer (MUX) 1412. In other words, the demultiplexer (DMUX) 1413 extracts the video stream and the audio stream (separates the video stream and the audio stream) from a bit stream read out from the stream buffer 1414. In other words, the demultiplexer (DMUX) 1413 is able to convert the format of the stream by demultiplexing (an inverse conversion of the conversion by the multiplexer (MUX) 1412). For example, the demultiplexer (DMUX) 1413 is able to acquire a transport stream supplied from the connectivity 1321, the broadband modem 1333, or the like for example via the stream buffer 1414, and by demultiplexing, is able to convert the transport stream into a video stream and an audio stream. Also, for example, the demultiplexer (DMUX) 1413 is able to acquire file data read out from any of various types of recording media by the connectivity 1321, for example via the stream buffer 1414, and by demultiplexing, is able to convert the file data into a video stream and an audio stream.

The stream buffer 1414 buffers a bit stream. For example, the stream buffer 1414 buffers a transport stream supplied from the multiplexer (MUX) 1412, and at a predetermined timing, or on the basis of an external request or the like, supplies the transport stream to the connectivity 1321, the broadband modem 1333, or the like, for example.

Also, for example, the stream buffer 1414 buffers file data supplied from the multiplexer (MUX) 1412, and at a predetermined timing, or on the basis of an external request or the like, supplies the file data to the connectivity 1321 or the like, for example, and causes the file data to be recorded on any of various types of recording media.

Furthermore, the stream buffer 1414 buffers a transport stream acquired via the connectivity 1321, the broadband modem 1333, and the like, for example, and at a predetermined timing, or on the basis of an external request or the like, supplies the transport stream to the demultiplexer (DMUX) 1413.

Additionally, the stream buffer 1414 buffers file data read out from any of various types of recording media in the connectivity 1321 or the like, for example, and at a predetermined timing, or on the basis of an external request or the like, supplies the file data to the demultiplexer (DMUX) 1413.

Next, an example of the operation of the video processor 1332 with such a configuration will be described. For example, a video signal input into the video processor 1332 from the connectivity 1321 or the like is converted to digital image data of a predetermined format such as 4:2:2 Y/Cb/Cr format in the video input processing unit 1401, and is successively written to the frame memory 1405. The digital image data is read out to the first image enlargement/ reduction unit 1402 or the second image enlargement/reduction unit 1403, subjected to a format conversion to a predetermined format such as 4:2:0 Y/Cb/Cr or the like and an enlargement/reduction process, and again written to the frame memory 1405. The image data is encoded by the encode/decode engine 1407, and written to the video ES buffer 1408A as a video stream.

Also, an audio signal input into the video processor 1332 from the connectivity 1321 or the like is encoded by the audio encoder 1410, and written to the audio ES buffer 1409A as an audio stream.

The video stream in the video ES buffer 1408A and the audio stream in the audio ES buffer 1409A are read out and multiplexed by the multiplexer (MUX) 1412, and converted to a transport stream, file data, or the like. The transport stream generated by the multiplexer (MUX) 1412 is buffered in the stream buffer 1414, and then output to an external network via the connectivity 1321, the broadband modem 1333, or the like, for example. Also, the file data generated by the multiplexer (MUX) 1412 is buffered in the stream buffer 1414, and then output to the connectivity 1321 or the like, for example, and recorded to any of various types of recording media.

Also, a transport stream input into the video processor 1332 from an external network via the connectivity 1321, the broadband modem 1333, or the like for example is buffered in the stream buffer 1414, and then demultiplexed by the demultiplexer (DMUX) 1413. Also, file data read out from any of various types of recording media in the connectivity 1321 or the like, for example, and input into the video processor 1332 is buffered in the stream buffer 1414, and then demultiplexed by the demultiplexer (DMUX) 1413. In other words, a transport stream or file data input into the video processor 1332 is separated into a video stream and an audio stream by the demultiplexer (DMUX) 1413.

The audio stream is supplied to the audio decoder 1411 via the audio ES buffer 1409B and decoded, and an audio signal is reproduced. Also, the video stream, after being written to the video ES buffer 1408B, is successively read out and decoded by the encode/decode engine 1407, and written to the frame memory 1405. The decoded image data is subjected to an enlargement/reduction process by the second image enlargement/reduction unit 1403, and written to the frame memory 1405. Subsequently, the decoded image data is read out to the video output processing unit 1404, format-converted to a predetermined format such as 4:2:2 Y/Cb/Cr format, additionally converted to an analog signal, and a video signal is reproduced and output.

In the case of applying the present technology to the video processor 1332 configured in this way, it is sufficient to apply the present technology according to the embodiments described above to the encode/decode engine 1407. In other words, for example, the encode/decode engine 1407 may include the functions of the image encoding apparatus 10 or the functions of the image decoding apparatus 60 described above, or both. With this arrangement, the video processor 1332 is able to obtain effects similar to each of the embodiments described above with reference to FIGS. 1 to 14.

Note that in the encode/decode engine 1407, the present technology (that is, the functions of the image encoding apparatus 10, the functions of the image decoding apparatus 60, or both) may be realized by hardware such as a logic circuit or the like, may be realized by software such as an embedded program, or may be realized by both of the above.

(Another Exemplary Configuration of Video Processor)

Figure 22:
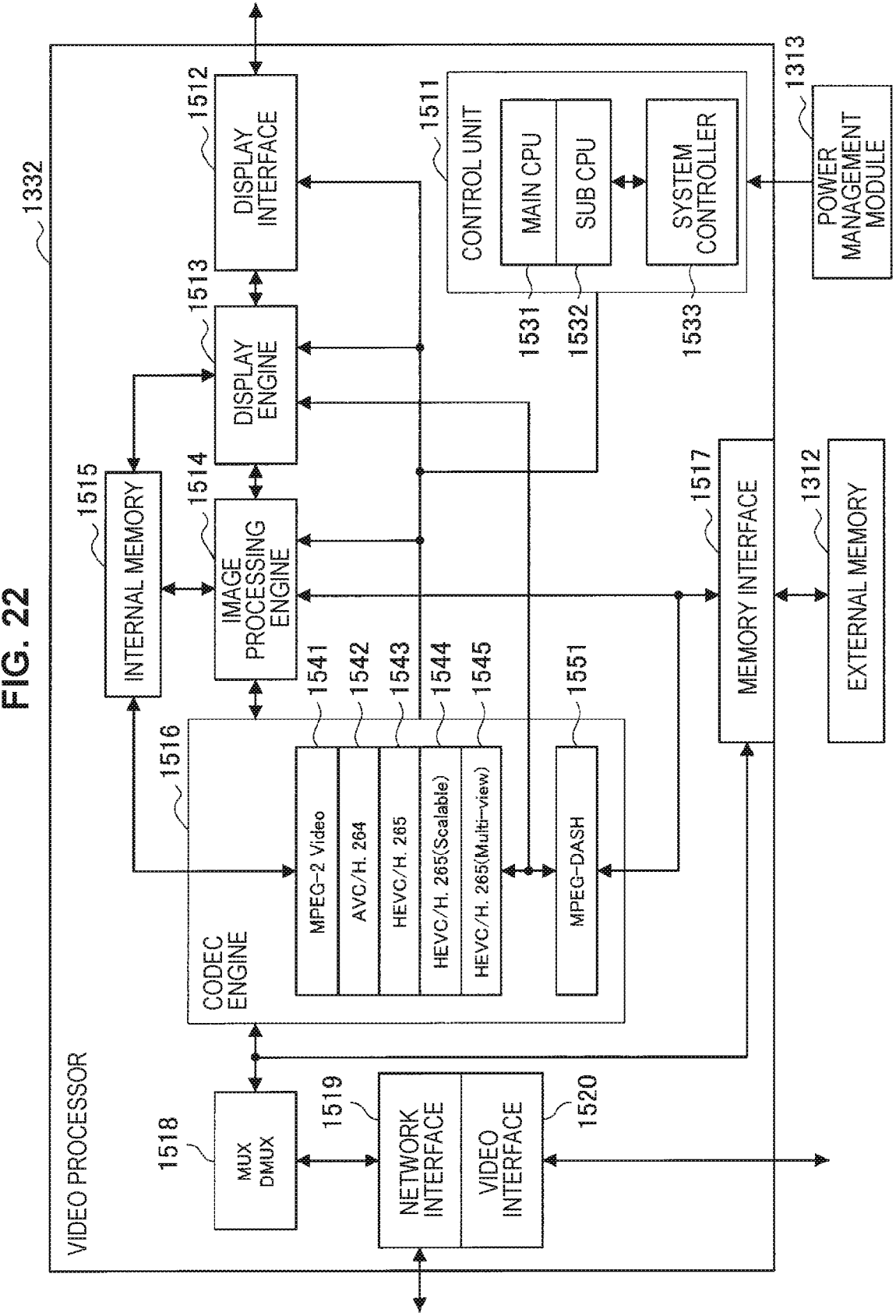
FIG. 22 is a block diagram illustrating another example of a schematic configuration of a video processor.
Figure 23:
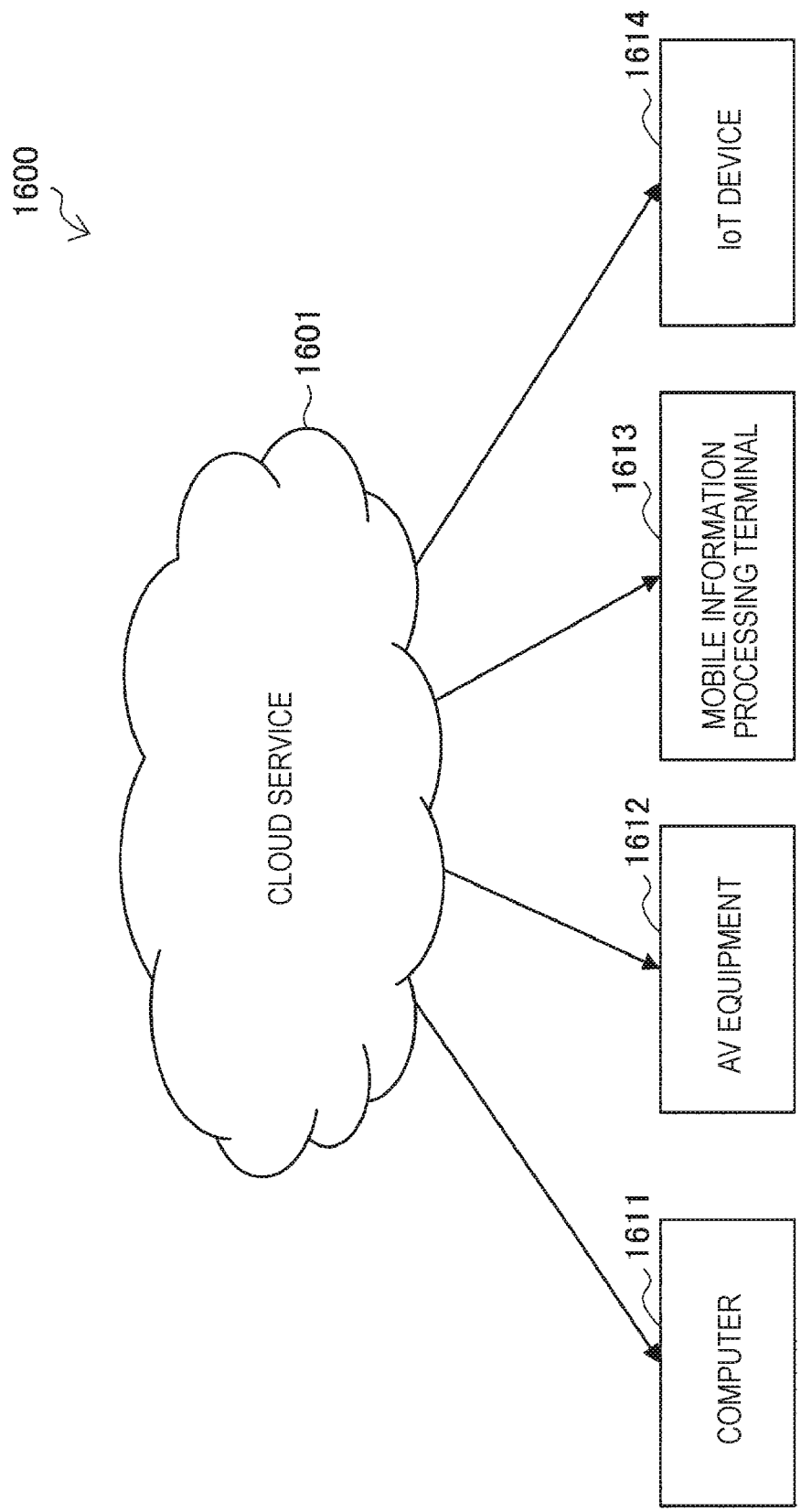
FIG. 23 is a block diagram illustrating one example of a schematic configuration of a network system.

FIG. 22 illustrates another example of a schematic configuration of the video processor 1332 applying the present technology. In the case of the example in FIG. 22, the video processor 1332 includes a function of encoding/decoding video data according to a predetermined method.

More specifically, as illustrated in FIG. 22, the video processor 1332 includes a control unit 1511, a display interface 1512, a display engine 1513, an image processing engine 1514, and internal memory 1515. Also, the video processor 1332 includes a codec engine 1516, a memory interface 1517, a multiplexer/demultiplexer (MUX DMUX) 1518, a network interface 1519, and a video interface 1520.

The control unit 1511 controls the operation of each processing unit in the video processor 1332, such as the display interface 1512, the display engine 1513, the image processing engine 1514, and the codec engine 1516.

As illustrated in FIG. 22, the control unit 1511 includes a main CPU 1531, a sub CPU 1532, and a system controller 1533, for example. The main CPU 1531 executes a program or the like for controlling the operation of each processing unit in the video processor 1332. The main CPU 1531 generates control signals in accordance with the program or the like, and supplies the control signals to each processing unit (in other words, controls the operation of each processing unit). The sub CPU 1532 fulfills a supplementary role to the main CPU 1531. For example, the sub CPU 1532 executes child processes, subroutines, and the like of the program or the like executed by the main CPU 1531. The system controller 1533 controls the operations of the main CPU 1531 and the sub CPU 1532, such as specifying programs to be executed by the main CPU 1531 and the sub CPU 1532.

The display interface 1512, under control by the control unit 1511, outputs image data to the connectivity 1321 and the like, for example. For example, the display interface 1512 converts digital image data to an analog signal and outputs an analog signal, or outputs the digital image data directly, as a reproduced video signal to a monitor apparatus or the like of the connectivity 1321.

The display engine 1513, under control by the control unit 1511, performs various conversion processes such as format conversion, size conversion, and gamut conversion on the image data to match the hardware specs of the monitor apparatus or the like that is to display the image.

The image processing engine 1514, under control by the control unit 1511 performs predetermined image processing on the image data, such as filter processing for improving image quality, for example.

The internal memory 1515 is memory provided inside the video processor 1332, and shared by the display engine 1513, the image processing engine 1514, and the codec engine 1516. For example, the internal memory 1515 is used to exchange data between the display engine 1513, the image processing engine 1514, and the codec engine 1516. For example, the internal memory 1515 stores data supplied from the display engine 1513, the image processing engine 1514, or the codec engine 1516, and as necessary (for example, in response to a request), supplies the data to the display engine 1513, the image processing engine 1514, or the codec engine 1516. The internal memory 1515 may be realized by any kind of storage device, but since the storage device typically is used to store small amounts of data such as image data in units of blocks, parameters, and the like, it is desirable to realize the storage device with semiconductor memory that is relatively (for example, compared to the external memory 1312) small in capacity but has a fast response speed, such as static random access memory (SRAM), for example.

The codec engine 1516 executes processes related to the encoding and decoding of image data. The encoding/decoding method supported by the codec engine 1516 may be any method, and there may be one or multiple such methods. For example, the codec engine 1516 may be provided with a codec function for multiple encoding/decoding methods, and may be configured to encode or decode image data by selecting from among the multiple methods.

In the example illustrated in FIG. 22, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as function blocks of codec-related processing, for example.

The MPEG-2 Video 1541 is a function block that encodes and decodes image data according to the MPEG-2 method. The AVC/H.264 1542 is a function block that encodes and decodes image data according to the AVC method. The HEVC/H.265 1543 is a function block that encodes and decodes image data according to the HEVC method. The HEVC/H.265 (Scalable) 1544 is a function block that scalably encodes and scalably decodes image data according to the HEVC method. The HEVC/H.265 (Multi-view) 1545 is a function block that multi-view encodes and multi-view decodes image data according to the HEVC method.

The MPEG-DASH 1551 is a function block that transmits and receives image data according to the MPEG Dynamic Adaptive Streaming over HTTP (MPEG-DASH) method. MPEG-DASH is a technology that uses the Hypertext Transfer Protocol (HTTP) to stream video, one feature of which being that appropriate encoded data is selected and transmitted in units of segments from among multiple sets of encoded data having different resolutions or the like prepared in advance. The MPEG-DASH 1551 executes the generation, transmission control, and the like of a stream conforming to the standard, while for the encoding/decoding of image data, the MPEG-2 Video 1541 to the HEVC/H.265 (Multi-view) 1545 are used.

The memory interface 1517 is an interface for the external memory 1312. Data supplied from the image processing engine 1514 and the codec engine 1516 is supplied to the external memory 1312 through the memory interface 1517. Also, data read out from the external memory 1312 is supplied to the video processor 1332 (the image processing engine 1514 or the codec engine 1516) through the memory interface 1517.

The multiplexer/demultiplexer (MUX DMUX) 1518 multiplexes and demultiplexes various image-related data, such as a bit stream of encoded data, image data, a video signal, and the like. The multiplexing/demultiplexing method may be any method. For example, when multiplexing, the multiplexer/demultiplexer (MUX DMUX) 1518 is not only able to collect multiple pieces of data into a single piece of data, but also add predetermined header information and the like to the data. Also, when demultiplexing, the multiplexer/demultiplexer (MUX DMUX) 1518 is not only able to divide a single piece of data into multiple pieces of data, but also add predetermined header information and the like to each divided piece of data. In other words, the multiplexer/demultiplexer (MUX DMUX) 1518 is able to convert the format of data by multiplexing/demultiplexing. For example, by multiplexing a bit stream, the multiplexer/demultiplexer (MUX DMUX) 1518 is able to convert the bit stream to a transport stream, which is a bit stream in a format for transmission, or to data in a file format (file data) for recording. Obviously, by demultiplexing, the inverse conversion is also possible.

The network interface 1519 is an interface for the broadband modem 1333, the connectivity 1321, and the like, for example. The video interface 1520 is an interface for the connectivity 1321, the camera 1322, and the like, for example.

Next, an example of the operation of such a video processor 1332 will be described. For example, when a transport stream is received from an external network through the connectivity 1321, the broadband modem 1333, or the like, the transport stream is supplied to the multiplexer/demultiplexer (MUX DMUX) 1518 through the network interface 1519 and demultiplexed, and decoded by the codec engine 1516. The image data obtained by the decoding of the codec engine 1516 is, for example, subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to file data by the multiplexer/demultiplexer (MUX DMUX) 1518, output to the connectivity 1321 or the like for example through the video interface 1520, and recorded on any of various types of recording media.

Furthermore, for example, file data of encoded data in which image data is encoded that is read out from a recording medium not illustrated by the connectivity 1321 or the like is supplied to the multiplexer/demultiplexer (MUX DMUX) 1518 through the video interface 1520 and demultiplexed, and decoded by the codec engine 1516. The image data obtained by the decoding of the codec engine 1516 is subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to a transport stream by the multiplexer/demultiplexer (MUX DMUX) 1518, supplied to the connectivity 1321, the broadband modem 1333, or the like for example through the network interface 1519, and transmitted to another apparatus not illustrated.

Note that the exchange of image data and other data between each of the processing units inside the video processor 1332 is performed by utilizing the internal memory 1515 and the external memory 1312, for example. Additionally, the power management module 1313 controls the supply of power to the control unit 1511, for example.

In the case of applying the present technology to the video processor 1332 configured in this way, it is sufficient to apply the present technology according to the embodiments described above to the codec engine 1516. In other words, for example, it is sufficient for the codec engine 1516 to include the functions of the image encoding apparatus 10 or the functions of the image decoding apparatus 60 described above, or both. With this arrangement, the video processor 1332 is able to obtain effects similar to the embodiments described above with reference to FIGS. 1 to 14.

Note that in the codec engine 1516, the present technology (that is, the functions of the image encoding apparatus 10) may be realized by hardware such as a logic circuit or the like, may be realized by software such as an embedded program, or may be realized by both of the above.

The above illustrates two configurations of the video processor 1332 as examples, but the configuration of the video processor 1332 may be any configuration, and may be a configuration other than the two examples described above. Also, the video processor 1332 may be configured as a single semiconductor chip, but may also be configured as multiple semiconductor chips. For example, a three-dimensionally stacked LSI chip in which multiple semiconductors are stacked is possible. Also, a configuration realized by multiple LSI chips is possible.

(Example of Application to Apparatus)

The video set 1300 can be embedded into any of various types of apparatus that process image data. For example, the video set 1300 can be embedded into the television apparatus 900 (FIG. 16), the mobile telephone 920 (FIG. 17), the recording/reproducing apparatus 940 (FIG. 18), the imaging apparatus 960 (FIG. 19), and the like. By embedding the video set 1300, the apparatus is able to obtain effects similar to each of the embodiments described above with reference to FIGS. 1 to 14.

Note that as long as the video processor 1332 is included, even a part of each configuration of the video set 1300 described above can be carried out as a configuration applying the present technology. For example, it is possible to carry out only the video processor 1332 as a video processor applying the present technology. Also, for example, the processor illustrated by the dashed line 1341 as described above, the video module 1311, and the like can be carried out as a processor, module, or the like applying the present technology. Furthermore, for example, the video module 1311, the external memory 1312, the power management module 1313, and the front-end module 1314 can also be combined and carried out as a video unit 1361 applying the present technology. With any of these configurations, it is possible to obtain effects similar to each of the embodiments described above with reference to FIGS. 1 to 14.

In other words, as long as the video processor 1332 is included, any type of configuration can be embedded into any of various types of apparatus that process image data, similarly to the case of the video set 1300. For example, the video processor 1332, the processor illustrated by the dashed line 1341, the video module 1311, or the video unit 1361 can be embedded into the television apparatus 900 (FIG. 16), the mobile telephone 920 (FIG. 17), the recording/reproducing apparatus 940 (FIG. 18), the imaging apparatus 960 (FIG. 19), and the like. Additionally, by embedding any configuration applying the present technology, the apparatus is able to obtain effects similar to each of the embodiments described above with reference to FIGS. 1 to 14, similarly to the video set 1300.

(6) Sixth Application Example: Network System

Additionally, the present technology is also applicable to a network system that includes multiple apparatus. FIG. 24 illustrates one example of a schematic configuration of a network system applying the present technology.

The network system 1600 illustrated in FIG. 24 is a system in which devices exchange information related to images (moving images) with each other over a network. The cloud service 1601 of the network system 1600 is a system that provides a service related to images (moving images) to terminals such as a computer 1611, audio-visual (AV) equipment 1612, a mobile information processing terminal 1613, and an Internet of Things (IoT) device 1614 communicably connected to the cloud service 1601. For example, the cloud service 1601 provides a service of supplying image (moving image) content to terminals, like what is called video streaming (on-demand or live streaming). As another example, the cloud service 1601 provides a backup service that receives and stores image (moving image) content from terminals. As another example, the cloud service 1601 provides a service of mediating the exchange of image (moving image) content between terminals.

The physical configuration of the cloud service 1601 may be any configuration. For example, the cloud service 1601 may include various servers, such as a server that saves and manages moving images, a server that delivers moving images to terminals, a server that acquires moving images from terminals, and a server that manages users (terminals) and payments, as well as any type of network, such as the Internet or a LAN.

The computer 1611 includes an information processing apparatus such as a personal computer, server, or workstation, for example. The AV equipment 1612 includes image processing apparatus such as a television receiver, a hard disk recorder, a game console, or a camera, for example. The mobile information processing terminal 1613 includes a mobile information processing apparatus such as a notebook personal computer, a tablet terminal, a mobile telephone, or a smartphone, for example. The IoT device 1614 includes any object that executes image-related processing, such as a machine, an electric appliance, a piece of furniture, some other thing, an IC tag, or a card-shaped device, for example. These terminals all include a communication function, and are able to connect to (establish a session with) the cloud service 1601 and exchange information with (that is, communicate with) the cloud service 1601. Also, each terminal is also able to communicate with another terminal. Communication between terminals may be performed by going through the cloud service 1601, or may be performed without going through the cloud service 1601.

When the present technology is applied to the network system 1600 as above, and image (moving image) data is exchanged between terminals or between a terminal and the cloud service 1601, the image data may be encoded/decoded as described above in each of the embodiments. In other words, the terminals (from the computer 1611 to the IoT device 1614) and the cloud service 1601 each may include the functions of the image encoding apparatus 10 and the image decoding apparatus 60 described above. With this arrangement, it is possible to reduce blocking artifacts further.

6. CONCLUSION

As described above, the embodiment of the present disclosure makes it possible to reduce blocking artifacts further.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, control information related to the present technology described in the above embodiments may be transmitted from the encoding side to the decoding side. For example, control information that controls whether or not to allow (or deny) the application of the present technology described above may be transmitted. Also, for example, control information that specifies an upper limit, a lower limit, or both of a block size that allows (or denies) the application of the present technology described above may be transmitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:

a decoding section configured to decode an encoded stream to generate a decoded image; and a filtering section configured to apply, with respect to a block boundary of the decoded image generated by the decoding section, a deblocking filter to pixels positioned near the block boundary in accordance with a boundary strength value set on the basis of information associated with a newly introduced encoding process or a newly introduced main encoding process.

(2)

The image processing apparatus according to (1), in which the filtering section applies the deblocking filter to pixels positioned near the block boundary in accordance with the boundary strength value set according to a combination of an existing condition and a condition based on information associated with a newly introduced encoding process.

(3)

The image processing apparatus according to (1), in which the filtering section applies the deblocking filter to pixels positioned near the block boundary in accordance with the boundary strength value set according to a combination of a condition related to a prediction process and a condition related to a transform process.

(4)

The image processing apparatus according to (3), in which the condition related to a prediction process or the condition related to a transform process includes a condition based on the information associated with a newly introduced encoding process.

(5)

The image processing apparatus according to any one of (1) to (4), in which the information associated with a newly introduced encoding process includes a transform identifier.

(6)

The image processing apparatus according to any one of (1) to (5), in which the information associated with a newly introduced encoding process includes a simplification/non-simplification of a transform process.

(7)

The image processing apparatus according to any one of (1) to (6), in which the information associated with a newly introduced encoding process includes an application/non-application of an intra block copy (intra BC).

(8)

The image processing apparatus according to any one of (1) to (7), in which the information associated with a newly introduced encoding process includes an application/non-application of an affine motion compensation prediction.

(9)

The image processing apparatus according to any one of (1) to (8), in which the information associated with a newly introduced encoding process includes an application/non-application of a position-dependent intra-prediction combination (PDPC).

(10)

The image processing apparatus according to any one of (1) to (9), in which the filtering section applies the deblocking filter to pixels positioned near the block boundary in accordance with the boundary strength value having an extended value.

(11)

The image processing apparatus according to (10), in which the filtering section applies the deblocking filter to a chrominance component of the pixels, on the basis of a quantization parameter associated with the chrominance component computed using the boundary strength value.

(12)

An image processing method including:

decoding an encoded stream to generate a decoded image; and applying, with respect to a block boundary of the decoded image, a deblocking filter to pixels positioned near the block boundary in accordance with a boundary strength value set on the basis of information associated with a newly introduced encoding process or a newly introduced main encoding process.

(13)

An image processing apparatus including:

a filtering section configured to apply, with respect to a block boundary of a locally-decoded decoded image, a deblocking filter to pixels positioned near the block boundary in accordance with a boundary strength value set on the basis of information associated with a newly introduced encoding process or a newly introduced main encoding process; and an encoding section configured to encode an image using the decoded image to which the filtering section has applied the deblocking filter.

(14)

An image processing method including:

applying, with respect to a block boundary of a locally-decoded decoded image, a deblocking filter to pixels positioned near the block boundary in accordance with a boundary strength value set on the basis of information associated with a newly introduced encoding process or a newly introduced main encoding process; and encoding an image using the decoded image to which the deblocking filter has been applied.

REFERENCE SIGNS LIST 10 image encoding apparatus
11 re-ordering buffer
12 control section
13 subtraction section
14 transform section
15 quantization section
16 lossless encoding section
17 accumulation buffer 18 rate control section
21 inverse quantization section
22 inverse transform section
23 addition section
24 deblocking filter
25 filter
26 frame memory
27 switch
28 mode setting section
30 intra-prediction section
40 inter-prediction section
60 image decoding apparatus
61 accumulation buffer
62 lossless decoding section
63 inverse quantization section
64 inverse transform section
65 addition section
67 SAO filter
68 re-ordering buffer
69 D/A conversion section
70 frame memory
71 selector
80 intra-prediction section
90 inter-prediction section
110 boundary strength setting section
120 filter application determination section
130 strength selection section
140 filtering section
150 determination control section

The invention claimed is:

1. An image processing apparatus, comprising:
a decoding section configured to:
   decode an encoded stream; and
   generate a decoded image based on the decoded stream; and
a boundary strength setting section configured to set a boundary strength value based on information associated with at least one of a newly introduced encoding process or a newly introduced main encoding process; and
a filtering section configured to apply, with respect to a block boundary of the decoded image, a deblocking filter to pixels in a vicinity of the block boundary, wherein the application of the deblocking filter is based on the set boundary strength value.

2. The image processing apparatus according to claim 1, wherein
the boundary strength setting section is further configured to set the boundary strength value based on a combination of an existing condition and a new condition, and
the new condition is based on the information associated with the newly introduced encoding process.

3. The image processing apparatus according to claim 1, wherein
the boundary strength setting section is further configured to set the boundary strength value based on a combination of a condition related to a prediction process and a condition related to a transform process.

4. The image processing apparatus according to claim 3, wherein
one of the condition related to the prediction process or the condition related to the transform process includes a new condition based on the information associated with the newly introduced encoding process.

5. The image processing apparatus according to claim 1, wherein
the information associated with the newly introduced encoding process includes a transform identifier.

6. The image processing apparatus according to claim 1, wherein
the information associated with the newly introduced encoding process includes one of a simplification of a transform process of a transform block or a non-simplification of the transform process, and
the simplification of the transform process corresponds to a case in which a short edge of the transform block is equal to or greater than a specific value.

7. The image processing apparatus according to claim 1, wherein
the information associated with the newly introduced encoding process includes one of an application of an intra block copy (intra BC) or a non-application of the intra BC.

8. The image processing apparatus according to claim 1, wherein
the information associated with the newly introduced encoding process includes one of an application of an affine motion compensation prediction or a non-application of the affine motion compensation prediction.

9. The image processing apparatus according to claim 1, wherein
the information associated with the newly introduced encoding process includes one of an application of a position-dependent intra-prediction combination (PDPC) or a non-application of the PDPC.

10. The image processing apparatus according to claim 1, wherein
the filtering section is further configured to apply the deblocking filter to the pixels in the vicinity of the block boundary based on the boundary strength value having an extended value.

11. The image processing apparatus according to claim 10, wherein
the filtering section is further configured to:
   compute, based on the boundary strength value, a quantization parameter associated with a chrominance component of the pixels; and
   apply the deblocking filter to the chrominance component of the pixels based on the quantization parameter.

12. An image processing method, comprising:
decoding an encoded stream;
generating a decoded image based on the decoded stream;
setting a boundary strength value based on information associated with at least one of a newly introduced encoding process or a newly introduced main encoding process; and
applying, with respect to a block boundary of the decoded image, a deblocking filter to pixels in a vicinity of the block boundary, wherein the application of the deblocking filter is based on the set boundary strength value.

13. An image processing apparatus, comprising:
a boundary strength setting section configured to set a boundary strength value based on information associated with at least one of a newly introduced encoding process or a newly introduced main encoding process; and
a filtering section configured to apply, with respect to a block boundary of a decoded image, a deblocking filter to pixels in a vicinity of the block boundary, wherein the application of the deblocking filter is based on the set boundary strength value; and an encoding section configured to encode an image using the decoded image to which the deblocking filter has been applied.

14. An image processing method, comprising:

setting a boundary strength value based on information associated with at least one of a newly introduced encoding process or a newly introduced main encoding process;

applying, with respect to a block boundary of a decoded image, a deblocking filter to pixels in a vicinity of the block boundary, wherein the application of the deblocking filter is based on the set boundary strength value; and encoding an image using the decoded image to which the deblocking filter has been applied.

* * * * *